US011520411B1

(12) United States Patent
Ferris et al.

(10) Patent No.: US 11,520,411 B1
(45) Date of Patent: Dec. 6, 2022

(54) ERGONOMIC, NEUTRAL-POSTURE, ADJUSTABLE, SEPARABLE, WIRELESS, KEYS-INPUT DEVICES/HOUSINGS WITH PALM- AND HYPOTHENAR-RESTS

(71) Applicants: Boak John Ferris, Long Beach, CA (US); Curtis Irwin, Long Beach, CA (US)

(72) Inventors: Boak John Ferris, Long Beach, CA (US); Curtis Irwin, Long Beach, CA (US)

( * ) Notice: Subject to any disclaimer, the term of this patent is extended or adjusted under 35 U.S.C. 154(b) by 0 days.

(21) Appl. No.: 17/848,955

(22) Filed: Jun. 24, 2022

(51) Int. Cl.
*G06F 3/02* (2006.01)
*G06F 3/023* (2006.01)

(52) U.S. Cl.
CPC ............ *G06F 3/0216* (2013.01); *G06F 3/021* (2013.01); *G06F 3/0231* (2013.01)

(58) Field of Classification Search
CPC ....... G06F 3/021; G06F 3/0231; G06F 3/0216
USPC .......................................... 345/168, 173–174
See application file for complete search history.

(56) References Cited

U.S. PATENT DOCUMENTS

| 2004/0196264 A1* | 10/2004 | Criscione | ................ | G06F 3/021 345/168 |
| 2007/0286663 A1* | 12/2007 | Kinney | ................ | G06F 3/0235 400/489 |

* cited by examiner

*Primary Examiner* — Calvin C Ma

(57) ABSTRACT

Dual, ergonomically ideal, neutral-posture, wireless-and-programmable, joinable keys-input devices/housings (FIGS. 1A and 1B): with hinged ratcheted bases to allow additional operator-preferred keys-input planes of key-address; with hypothenar- and palm-rests; with customizable domed keys set in a customizable four-stair-stepped-key-ledges-configuration to match the natural curl and reach of operators' relaxed fingers; with the same domed keys arrayed to provide closer reach for the fingers with less extension of said fingers; with elevated and dedicated little-finger keys for ease of access; with two-way scalloped thumb-levers operable by simply dropping the relaxed thumbs; with joiner-rings for uniting the devices/housings; with built-in bolts-accesses for attachment to chair- or desk-arms; with embedded lenses for wireless transmission, projection, or remote control, or other; with integrated microphone for voice commands or recording; with a plurality of keys for possible alphanumeric input; with additional utility keys. Other embodiments obtain.

2 Claims, 15 Drawing Sheets

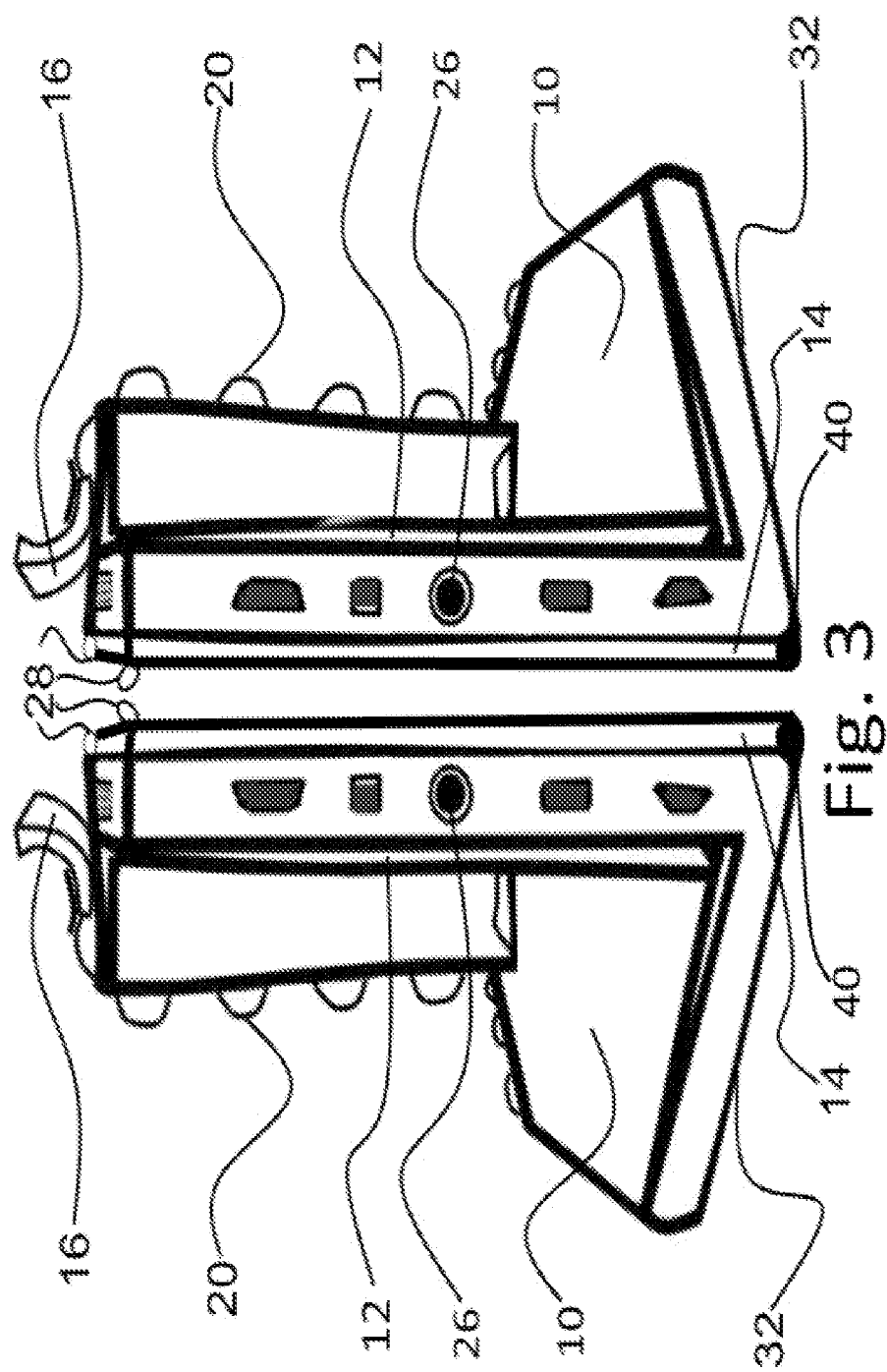

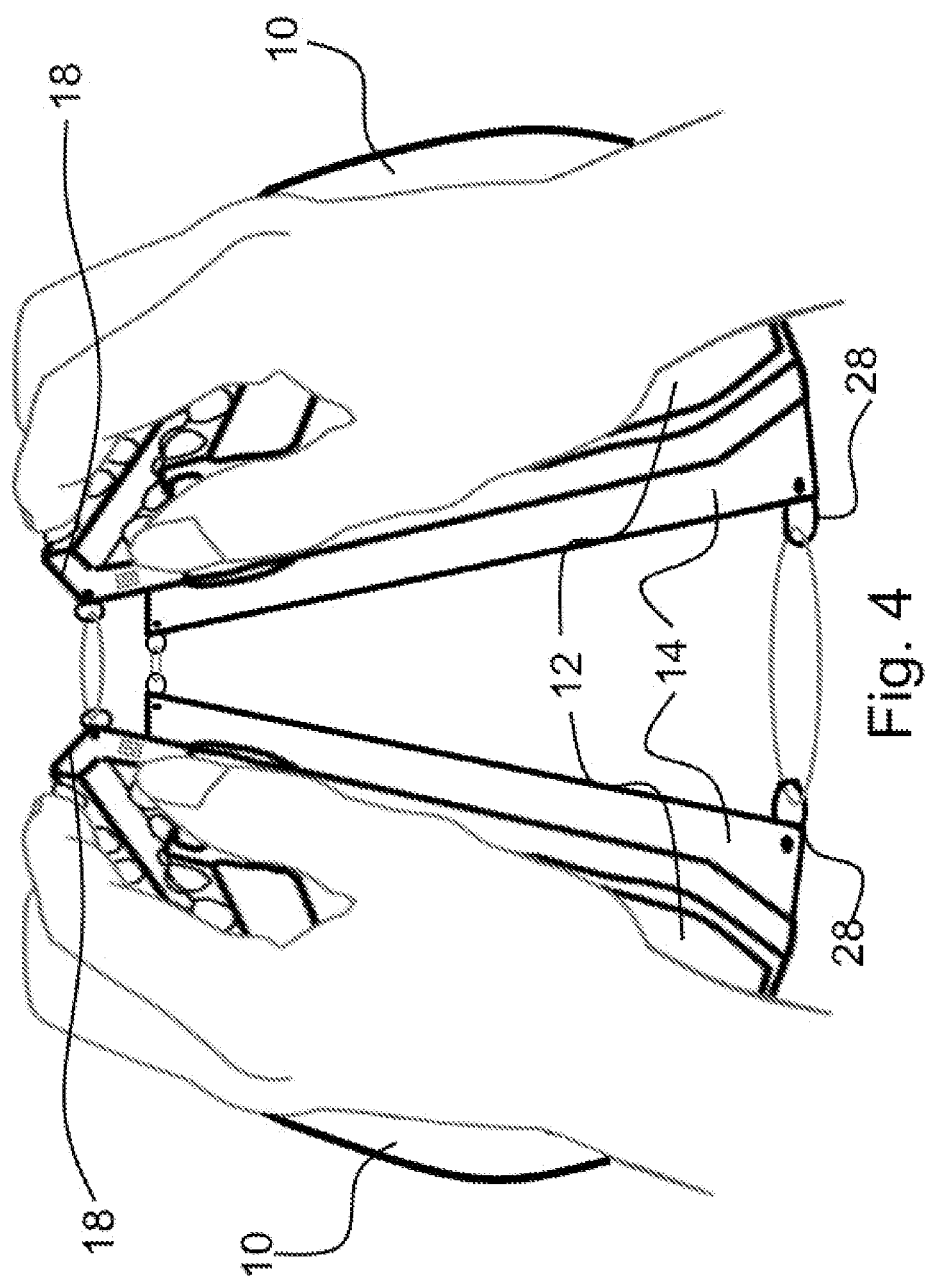

ERGONOMIC, NEUTRAL-POSTURE, ADJUSTABLE, SEPARABLE, WIRELESS, KEYS-INPUT DEVICES/HOUSINGS WITH PALM- AND HYPOTHENAR-RESTS

CROSS-REFERENCE TO RELATED APPLICATIONS

Not applicable

FEDERALLY-SPONSORED RESEARCH

Not applicable

SEQUENCE LISTING OR PROGRAM

Not Applicable

BACKGROUND—PRIOR ART

The following list tabulates prior art that appears relevant.

| Pat. No. | Kind Code | Issue Date | Patentee(s) |
|---|---|---|---|
| | | U.S. patents | |
| 5,067,834 | B41J | Nov. 26, 1991 | Szmanda, et. al. |
| 5,160,919 | | Nov. 3, 1992 | Mohler, et al |
| 5,137,384 | | Aug. 11, 1992 | Spencer, et al |
| 5,426,449 | G09G | Jun. 20, 1995 | Danziger |
| 6,127,949 | | Jan. 3, 2000 | Dodd |
| 6,031,518 | | Feb. 29, 2000 | Dodd |
| 6,132,118 | | Oct. 17, 2000 | Grezeszak |
| 0,011,503 | A1 | Jan. 16, 2003 | Levenson |
| 7,088,339 | B2 | Aug. 8, 2006 | Gresham |
| 7,324,019 | B2 | Jan. 29, 2008 | Levenson |
| | | U.S. patents Cited | |
| 4,661,005 | B41J | Apr. 28, 1987 | Lahr (H) |
| 5,073,050 | | Dec. 17, 1991 | Andrews |
| 5,178,477 | | Jan. 12, 1993 | Gambaro |
| D345152 | | Mar. 15, 1994 | Mermod Jr |
| 5,689,253 | | Nov. 18, 1997 | Hargreaves, et al |
| 5,717,431 | | Feb. 10, 1998 | Chia-Ying |
| 5,788,386 | | Aug. 4, 1998 | Hayashi, et al |
| 6,005,496 | | Dec. 21, 1999 | Hargreaves, et al |
| 6,022,156 | | Feb. 8, 2000 | Blish |
| 607,556 | | Jun. 13, 2000 | Rice |
| 6,222,526 | B1 | Apr. 24, 2001 | Holmes |
| 6,315,472 | | Nov. 13, 2001 | Muller |
| 6,765,502 | B2 | Jul. 20, 2004 | Boldy |
| 0,151,673 | A1 | Jul. 14, 2005 | Mercier |
| D541802 | | May 1, 2007 | Weingartner |
| 7,273,324 | B2 | Sep. 25, 2007 | Mercier |
| 7,338,224 | B2 | Mar. 4, 2008 | Jones, et al |
| D5678145 | | Apr. 29, 2008 | Zalewski, et al |
| 2009/0146960 | A1 | Jun. 11, 2009 | Gim/Sune |
| 8,011,842 | | Sep. 6, 2011 | Wilson |
| D658649 | S | May 1, 2012 | Mody (GC) |
| 8,347,791 | B1 | Jan. 18, 2013 | Gray, et al |
| 8,427,428 | B2 | Apr. 23, 2013 | Linegar and Norwalk |
| 8,487,876 | B2 | Jul. 16, 2013 | Ikeda, et al |
| 8,649,164 | B1 | Feb. 11, 2014 | Kwok |
| 8,681,102 | | Mar. 25, 2014 | Edenborough |
| 0,103,503 | | Apr. 14, 2016 | Pham |
| 0,139,680 | | May 19, 2016 | Noorzai and Omar |
| 9,423,881 | B2 | Aug. 23, 2016 | Norwalk |
| 9,268,364 | B2 | Feb. 23, 2016 | Parker |
| 9,504,912 | B2 | Nov. 29, 2016 | Ikeda, et al |
| 10/201,747 | B2 | Feb. 12, 2019 | Mistry |

NON-PATENT LITERATURE DOCUMENTS

Fagarasanu M., Kumar, S., Narayan, Y., "Measurement of angular wrist neutral zone and forearm muscle activity, *Clin. Biomech.*, Aug. 1, 2004: 19: 671-677.

Keir P J, Wells R P, Ranney D A. "Passive Properties of the forearm musculature with reference to hand and finger postures." *Clin. Biomech.* 1996; 11: 401-409.

McKeown, C. (2008). *Office Ergonomics: Practical Applications* (1$^{st}$ ed.). CRC Press.

Savage, R. "The influence of wrist position on the minimum force required for active movement of the interphalangeal joints." *J. Hand Surg. Am.*, 10.1016/0266-7681(88)90082-4 (1988).

Wu G., van der Helm F C, Veeger H E, Makhsous M, Van Roy P, Anglin C, Nagels J, Karduna A R, McQuade K, Wang X, Werner F W, Buchholz B. "ISB recommendations on definitions of joint coordinate systems of various joints for the reporting of human joint motion. Part II: shoulder, elbow, wrist, and hand." *J Biomech* 38: 981-992, 2005.

BACKGROUND OF THE INVENTION

Advances in ergonomic analyses have demonstrated that horizontally-oriented keys-input devices, with the plurality of operable keys presented on a horizontal surface, including, but not limited to, alphanumeric keyboards, cause unnecessary stress and force to human operators' fingers, wrists, forearms, and shoulders. Over time these stresses and forces lead to injury, time away from work, medical issues, and worse. Expert ergonomists now recognize and advocate that human operators who use keys-input devices/keyboards for work or recreation find such devices as allow for operation of a plurality of keys from the neutral posture—with the shoulders, forearms, wrists, hands, and fingers oriented in the position (called the neutral-posture) that causes the least stress on these listed body parts as contrasted with any other shoulders-forearms-wrists-hands positions.

This neutral-posture is described and recommended in four expert-publications on human ergonomics: Keir P J, Wells R P, Ranney D A., "Passive Properties of the forearm musculature with reference to hand and finger postures," *Clin. Biomech.* 1996; Wu G., van der Helm F C, Veeger H E, Makhsous M, Van Roy P, Anglin C, Nagels J, Karduna A R, McQuade K, Wang X, Werner F W, Buchholz B., "ISB recommendations on definitions of joint coordinate systems of various joints for the reporting of human joint motion. Part II: shoulder, elbow, wrist, and hand," *J Biomech* 38: 981-992, 2005; Fagarasanu M., Kumar, S., Narayan, Y., "Measurement of angular wrist neutral zone and forearm muscle activity, *Clin. Biomech.*, Aug. 1, 2004: 19: 671-677; and McKeown, C., *Office Ergonomics: Practical Applications* (1$^{st}$ Ed.) CRC Press, 11: 401-409, 2008.

Fagarasanu et al. add an additional advisory, noting how "self-selected wrist neutral posture reduced the muscle activity significantly . . . " (2004), where the expert authors observe that human operators who use keys-input/keyboard devices also may or must self-select personalized wrist-neutral postures. These expert publications thus indicate that an ideal ergonomic keys-input device should not only embody in a perfect neutral-posture position, but also embody with additional design features such that operators can modify or adjust the device away from the neutral-posture toward optional or independent angles of their wrist postures—by altering the vertically-rotational aspects or horizontally-rotational aspects or other relative positions and spacings of/between the device(s)—so as to avoid unwanted or harmful stresses to the shoulder, upper arms, forearms, wrists, and hands.

To find and understand the recommended neutral-posture, human beings can start by standing or sitting, with arms hanging loosely at the sides, and then simply raise solely the forearms straight up from the elbow until the forearms are parallel to the floor, (a forearm-elevation called herein an operator's unique parallel-forearm-plane/forearm plane) and with the forearms parallel to each other, with elbows bent at an approximate right angle, all while keeping the wrists and fingers completely relaxed. A number of observations of this neutral-posture position become apparent: the forearms are neither pronated nor supinated; the wrists relax and the hands relax and hang downward from the wrists at an almost-90-degree angle relative to the forearms; the fingers also curl inward slightly toward the torso, with the center of the fingerprints pointing toward the waist or 'beltline'; the thumb-tips point toward each other while the thumb-prints point toward the floor; the palms face neither the floor nor are parallel to each other, and, instead, the palms face the lap; and the distance from one palm to the other is unique to each human, as determined by the width as measured between the two shoulders or as measured between the two suspended elbows. Despite the relaxed hand-and-wrist neutral-posture defined in this above-described position, however, ergonomists have also noted that the arms and shoulders still receive stress, as the upper arms and shoulders must bear the weights of holding up the raised forearms, elbows, wrists, hands, and fingers, while the forearms experience stress holding up the weights of the wrists, hands, and fingers. Furthermore, while the operator's unique parallel forearm plane is parallel to the operator's lap, said plane is not at the same height, nor on the same plane as the operator's lap (when an operator is sitting in a chair with a straight back and when barring operator-disability) and said forearm plane is above the lap, nor is that forearm plane at the same height as commercially available and non-height-adjustable horizontal desktops and table-tops; and an operator would be best advised to find a custom table or desktop which height matches the height of the operator's unique parallel forearm plane—depending on whether the operator prefers standing or sitting or other in-between when keying input.

To provide ergonomic reliefs, flat or horizontal ergonomic hand-held keyboards and keys-input devices have been proposed, but any and all of these force human operators to bear the weights of hands, wrists, forearms, as well as to force operators to bear the weights of the respective devices, and so these devices remain irrelevant to the attainment of true neutral-posture ergonomic keys-input devices.

Standard flat or horizontal ergonomic keyboards and keys-input devices have been proposed, but without elevating and angling two halves of the keying surface vertically in some way toward a neutral position for each hand; such keyboards thus force operators to pronate both forearms, to push elbows out, and to exert unhealthy stress on wrists, forearms, upper arms, shoulders; thus, all such flat unmodified "ergonomic" keyboards fail to achieve an idealized neutral position. Examples of such keyboards in this orientation are U.S. Pat. No. 0,103,503, Apr. 14, 2016, to Pham, U.S. Pat. No. 8,011,842 Sep. 6, 2011, to Wilson, and U.S. Pat. No. 4,661,005, Apr. 28, 1987, to Lahr. With some horizontal keyboards, a palm rest is added, which does not solve the stresses created by pronating the forearms, as with U.S. Pat. No. 607,556, Jun. 13, 2000, to Rice.

Some modified proposed ergonomic horizontal and flat keyboards curve the front-ledge of the keying surface along the horizontal plane (making it curvilinear on a horizontal plane), as with U.S. Pat. No. 8,083,424, Dec. 27, 2001, Camacho et. al, U.S. patent D541802, May 1, 2007 to Weingartner, U.S. Pat. No. 5,073,050, Dec. 17, 1991, to Andrews, and U.S. Pat. No. 9,268,364, Feb. 23, 2016, to Parker, yet these keyboards still force operators to maintain the pronated forearms; while some proposed horizontal keyboards tilt the front edge of the horizontal keying surface up and forward, as with U.S. Pat. No. 0,139,680 (May 19, 2016), to Noorzai and Omar and U.S. Pat. No. 8,681,102, Mar. 25, 2014, to Edenborough, forcing operators to lift the palms and suspend the weights of the hands without forearms' support while bending the wrists forward, while the forearms are still pronated; while still other proposed keyboards tilt the front plane of the horizontal keying surface backward, such as U.S. Pat. No. 0,146,960 (2009) to Gim and Sune, forcing operators to cock the wrists backward while the forearms are still pronated-all of which cause unnecessary and unhealthful stress and forces to operators' wrists, forearms, upper-arms, and shoulders. Some horizontal keyboards insert concave wells into the horizontal keyboard frame for the hands or fingers to nest in, as with U.S. Pat. No. 5,689,253, Nov. 18, 1997, to Hargreaves and U.S. Pat. No. 5,178,477, Jan. 12, 1993 to Gambaro, or some keyboards insert finger-grooves into the horizontal keyboard frame, as with U.S. Pat. No. 6,765,502, Jul. 20, 2004, to Boldy, but these proposed devices still require operators to pronate the forearms to address the horizontal aspects of the keyboards.

Another group of proposed horizontal keyboards either split the domain of alphanumeric keys into two halves, or move these horizontal keyboard halves further apart in order to widen the working-distance between operators' palms, as with U.S. Pat. No. 5,073,050, Dec. 17, 1991, to Andrews, U.S. patent D345152, Mar. 15, 1994, to Mermod Jr.; U.S. Pat. No. 5,717,431, Feb. 10, 1998, to Chia-Ying; U.S. Pat. No. 5,788,386, Aug. 4, 1998, to Hayashi; U.S. Pat. No. 6,022,156, Feb. 8, 2000, to Blish; U.S. patent Ser. No. 10/345,918, Jul. 9, 2019, to Norwalk, and U.S. Pat. No. 6,315,472, Nov. 13, 2001, Muller, but these keyboards still remain horizontal, requiring operators to pronate forearms.

One proposed ergonomic horizontal dual and separable keys-input device, U.S. Pat. No. 7,273,324, Sep. 25, 2007, to Mercier, embodies as two sets of wrist straps with attached, glove-like, open finger-strips arraying plural keys, but this device must be operated on a horizontal plane, requiring operators to pronate the forearms, while if operators attempted to operate the keys from a more vertical position, then they would be unable to operate all keys without significant contortion of the fingers, while being unable to exert equal pressure on the keys.

To help operators address keys with a more neutral and vertical posture, a keyboard has been proposed splitting the keyboard into haves and then elevating each half along a clockwise or counter-clockwise vertical plane, to somewhere between 30 degrees and 60 degrees, such as with U.S. Pat. No. 5,160,919, Nov. 3, 1992, to Mohler et al and U.S. Pat. No. 5,067,834, Nov. 26, 1991 to Szmanda, et al, but the distances between halves are not adjustable, nor can each half be used independently and non-cabled, while no palm rests are provided, and no hypothenar rests are provided, so human operators must bear the weights of the hands and forearms, while also being concerned about accidentally depressing keys. Another keyboard was proposed moving the two halves into the correct neutral position, U.S. Pat. No. 5,137,384, Aug. 11, 1992, to Spencer et al, but again each half is non-separable from the other, the wrist-position-angles are not operator-adjustable, and human operators must strain and extend the fingers to reach linear rows of square keys.

Some ergonomic keys-input gaming devices have been proposed, to provide a zero- or neutral posture, as with the half-steering-wheel-styled U.S. Pat. No. 9,504,912, Nov. 29, 2016, to Ikeda, but the device still requires dual-forearms-pronation to address its narrow grip-profile, lacks a plurality of keys, lacks adjustability to an operator-preferred wrist-angle, and requires operators to push with the thumbs, rather than invites operators to allow the thumbs to rest; and thus the device creates stresses on and exerts forces against operators. Another neutral-posture-device has been proposed designed similar to a pistol-grip, U.S. Pat. No. 6,222,526, Apr. 24, 2001, to Holmes, that also lacks a plurality of keys, lacks operator-preferred adjustability, and is intended for a single hand.

A vertical, zero-position keyboard has been proposed, U.S. Pat. No. 6,132,118, Oct. 17, 2000, to Greseszak, with its system, that rests in the lap, but it is solely alphanumeric, while the keys-input angles are neither adjustable along both vertical and horizontal clockwise and counter-clockwise planes, as operators might prefer, nor is the device separable into two independent keys-input halves; the device requires cabling; the device is not wireless; furthermore, the device is intended for positioning in an operator's lap which may not provide the operator with the best-preferred forearm-plane of ergonomic comfort, as discussed.

A vertical keys-input device has been proposed in the shape of a pyramid, U.S. Pat. No. 5,426,449, Jun. 20, 1995, to Danziger, which maintains a quasi-neutral-posture but does not reach the zero-neutral-posture vertical position; also, it is alphanumeric and cabled to its host device; it requires operators to hold their hands off the keys, to prevent accidental key-engagement, while providing no wrist/hypothenar support, forcing operators to bear the weights of the hands, wrists, and forearms; it requires the operators' thumbs to push keys forward rather than to simply drop the thumbs to engage keys; its two right and left keys-input planes are not separable, nor are their vertical keys-input surfaces' angles operator-adjustable; and its square keys in linear horizontal rows require operators' to extend their fingers to engage wrist flexor-tendons and muscles and to thus experience unnecessary stress and tension. Other vertical keys-input pyramidal devices have been proposed, U.S. Pat. No. 6,127,949, Oct. 2, 2000 to Dodd and U.S. Pat. No. 6,031,469, Feb. 29, 2000, to Dodd, where the device does not reach a completely neutral-posture nor vertical position, where the operators' fingers must fit into grooves inset in the keys-input planes, where these keys-input planes' angles are not operator-adjustable, where the thumbs must push, and where the keys-input planes are not separable.

A more relevant single, keys-input device, oriented in neutral vertical position with hypothenar and palm rest has been proposed, U.S. Pat. No. 7,324,019, Jan. 29, 2008, to Levenson, but it disallows operators to adjust the device into any preferred wrist-and-palm partly-horizontal posture, and it disallows operators to adjust the clockwise or counter-clockwise vertical keys-input planes of the device, while it also requires operators to extend the fingers to reach keys set uppermost and inside an enclosed and concave clamshell-shaped surface. Another relevant vertical, neutral-posture keys-input device, with hypothenar and palm rests has been proposed, U.S. Pat. No. 7,088,339, Aug. 8, 2006, to Gresham, with an adjustable horizontal angle for the keys-input surfaces, but the two keys-input surfaces are not separable outside their enclosing frame, nor can these keys-input surfaces be rotated clockwise or counter-clockwise on the vertical plane as much as operators might require or prefer, while the thumb-keys require pushing the thumbs forward, rather than allowing the thumbs to simply drop to depress keys.

In short, all of the ergonomic keys-input-devices/keyboards heretofore known exhibit one or more of the disadvantages below:

(a) They are flat or horizontal without providing for keys-input via the neutral posture or without allowing operators to adjust the horizontal or vertical angles of hands-address, or both (b) They need to be hand-held and their weights suspended by operator efforts (c) They are forced-as-vertical or forced-into-neutral position without providing an operator-preferred rotational vertical-angular-adaptability and/or orientation (d) They lack key-pluralities (e) They lack palm rests (f) They lack hypothenar rests (g) They require cabling or are not programmable (h) Their split-keyboard-halves when provided cannot be positioned to perfectly match operators' unique shoulder-widths distances (i) Their elevations of keys-input-plane-angles and of keys-input surfaces when provided are not operator-adjustable (k) Their square keys when arranged linearly force operators to exert wrists, forearms, and hands to extend the fingers to depress keys (l) Their thumb-inputs, when provided, require operators to exert to push the thumbs forward rather than to simply drop the thumbs naturally (m) Their keys, when presented in a neutral-posture and embodied as vertical keys-input devices, are not easily visible to operators who might prefer or who might opt to view the key arrays (n1) They lack functional adaptability to be desktop, table-top, variable-angular-surface, and/or chair-arm-mounted (n2) They lack functional adaptability to be fastened or to be allowed to slide on a desktop, table-top, or variable-angular-surface (o) They are forced alphanumeric (p) They force operators to address vertical keys-input plane surfaces (q) They do not provide operator-adjustable key-pressures and assignments via software or hardware programming or via piezoelectric glass keys or via other key-pressure-recognition actuator-technologies (r) They do not embody as device-housings that can host multiple technologies, such as integrated computers, telephones or cell phones, audio and video recorders, cameras, projectors, lasers, infra-red beaming, and more (s) They do not provide options to integrate mouse-cursor or arrow-keys or touchpad functionalities and similar technologies (t) They do not allow for "pinching" motions or gestures between operators' thumbs and forefingers/other fingers, as operators might require to implement technological or graphical-interface or other key-input commands (u) They do not use domed keys, which require less surface area than square ones, and thereby which allow easier reach-of-access and key-proximity for operators' hands and fingers (v) They require a too-low placement in the operator's lap, which is not even with the operator's ideal forearm-plane (w) Their little-finger-keys are situated on the same planes as their index-, middle-, and ring-finger keys—thus requiring extra effort from the smallest digit.

SUMMARY

In accordance with one embodiment, ergonomic, neutral-posture, adjustable, separable, wireless, keys-input devices/housings with palm and hypothenar rests comprise differing-depth and 'stair-stepped' key-ledges for easy four-fingers-per-hand access to easy-to-touch and close-proximity domed keys, raised little-finger-key-ledges and keys for ease of little-fingers' reach-and-contact, palm-rests for supporting curved-yet-relaxed fingers over the keys, hypothenar rests to suspend the weights of the hands to release those selfsame weights from fatiguing the wrists and forearms, thumb-adjacent two-way scalloped thumb-keys that accept the least-energy-required downward gravity-assisted motions of the relaxed thumbs and that serve as two-way switches, all in modular housings intended to be used in neutral-posture or in handshake or in operator-preferred orientations, or to be used as keys-input extension-devices bolted to the ends of the arms of work, game, surgical, musical, or other types of chairs.

Advantages of the Devices/Housings

Perfect ergonomic keys-input devices/housings and methods of use should address all of the observations above, as indeed the present devices/housings, designs, embodiments, and methods-of-use do.

a) The separable devices/housings allow for any kind of single- or dual-handed operator-keys-input to be achieved from an ideal vertical and neutral-posture, as recommended by experts, while also allowing for any user-preferred adjustable angle of rotation on both vertical and horizontal planes to meet personalized ergonomic needs, as also recommended by experts.

b) The separable devices/housings and their bases provide multiple joiner rings such that the two halves may be joined by customizable links of any operator-preferred length.

c) The devices/housings may be placed on any height-customizable desktop, table-top, or other horizontal surface, for ergonomic comfort, especially if the surface-height matches the height of the operator's standing or sitting unique parallel-forearm-plane, which may be above or below standardized table, desk, and countertop surfaces.

d) The separable devices/housings may be positioned on, adhered to, or bolted onto horizontal surfaces at preferred distances or at otherwise operators' unique shoulders'-width-distances apart, as preferred by operators.

e) The devices/housings support the weights of the hands, fingers, wrists, and forearms by dedicated hypothenar rests and by dedicated palm rests.

f) The devices/housings are fully software- or hardware-programmable (or both) for any professional or recreational keys-input functions, be these latter medical, surgical, mathematical, musical, word-processing, calculating, scientific, gaming, or other g) While the devices/housings are wireless and programmable with space for battery(ies) and thus obviate cabling, they still provide utility access-ports in case operators prefer to or need to cable the devices/housings to peripheral or to primary or to other devices/housings for communication, powering or interfacing with other technologies.

h) The separable devices'/housings' unique design features embody two bases, the one served by the obverse side of each of the hypothenar rests to allow operators to position or bolt or stabilize the device in an ideal vertical and neutral-posture, the other served by each of the integrated ratcheted and hinged and lockable bases, to allow operators to raise, to elevate, and to bolt or to position or to stabilize the keying-planes of the devices'/housings' halves in such user-preferred horizontal or vertical rotational degrees of orientations as the operators may prefer. [Note that operators may have a preferred unique degree of device-orientation for each hand, as differs from the other; a feature for which the designs of these devices/housings provide.]

i) The devices/housings provide domed circular keys, which, due to a reduced surface area that more closely matches the sizes and shapes of human finger-tips, can be positioned closer together than square or concave keys, and are thus easier to find, feel, and depress than square or concave keys, so operators do not have to strain wrists and fingers to extend their fingers and reach spread-out keys.

j) The separable devices/housings, when used joined, separated, or otherwise simultaneously, embody a plurality of at least sixty keys to allow for full English or other alphanumeric entries, along with allowing for a spectrum of other such commands as may be programmed. Of the sixty current keys, thirty-four keys are ergonomically principal, for full alphabetic access (as English users may prefer), two are two-way thumb-keys, and twenty-four are utility keys as may be programmed or required for other keys-input and command functions. (Note that the devices/housings have room for more than 24 utility keys.)

k.1) The devices/housings embody four stair-stepped-key-ledges for the thirty-four primary or principal keys; these stair-stepped-key-ledges and keys are designed to follow the natural curve of operators' relaxed fingers as the fingers tend to naturally curl toward the palm; while commercially-produced iterations of the devices/housings, and of the stair-stepped key-ledges, can be modified or customized to accommodate different operators' hand-widths' and finger-lengths' specifications.

k.2) The devices/housings embody dedicated, scalloped, two-way thumb-keys that accommodate the shapes of the thumbs, and can be operated by simply dropping the thumbs downward, much as with a horizontal-keyboard "spacebar," and which can also be operated by pushing the thumb inward toward the device to simulate a "pinching" or squeezing motion, as may be operator-desired or programmed.

k.3) The devices/housings embody dedicated raised little-finger-key-ledges to provide easier ergonomic reach and access to a domed key specifically for operators' little-fingers.

l.1) The devices/housings embody built-in bolt-accesses for bolting the devices/housings to the ends of suitably designed professional medical, gaming, business, lounging, recreational, disabled-persons', or other chairs, so that operators can realize an enhanced or operator-modified ergonomic neutral-posture for keys-input-operations-comfort without needing to sit at a desk.

l.2) The devices'/housings' embodied bolt-accesses, to bolt the devices/housings to the ends of chair and desk arms, allow each of the devices/housings to be rotated and locked, if required, into any operator-preferred vertical-to-horizontal orientation, including, but not limited to, the ideal ergonomic neutral-posture.

m) The separable devices/housings embody with sufficient interior space to incorporate or integrate a battery or batteries, miniaturized computers, processors, cell-phones, laser-pointers, mini-projectors, telemetry-technology, fans, speakers, microphones, audio connectors, or other such technologies as may be evolved.

n) The devices/housings embody with a multipurpose interchangeable front-facing lens for filming, photographing, projecting, for wireless transmission, for infrared-beaming, for laser-pointing, for telecommunications, telemetry, or for such other technology as may require miniaturized lenses combined with or integrated into such devices/housings.

o) The devices/housings embody with an allowance for an integrated miniaturized projector that can project graphics, alphanumeric, hand-layouts, finger-positions, or other projected content onto any suitable vertical surface, obviating the need for a cabled or even a wireless dedicated monitor.

p) The devices/housings, along with their keys-input functions, accept software and/or hardware programming, for any purpose, including, but not limited to, projecting images of the operators' hands as positioned on the same device onto a screen or monitor, so that operators can see their fingers on the keys, if they so choose, without requiring mirrors or other apparatuses for viewing operators' fingers-on-the-keys.

q.1) Because they are programmable, the devices'/housings' keys' response-times and latencies can be software- or hardware-programmed to accept any operators-set fingers-pressures sensitivities and timings, so that operators can adjust the devices/housings to be touch- or time-sensitive, so that keys do not actuate until so desired by operators, say, for operators who like to rest their fingers on keys without instant actuation, or for operators engaged in medical surgeries who may use the keys to move surgical robots, or for musicians using the devices/housings for musical creation or processing, for examples.

q.2) The devices/housings embody with integrated microphones which can transmit operators' voice-to-key commands for key-actuations, for timings of key-actuations, and for other such voice-commanded keys-input functions as operators may require or desire, whether through software- or hardware-programming or through built-in hardware functioning.

r) Any one or more of the devices'/housings' keys can be custom-fit with dedicated cursor-keys, with touchpads, or with other technologies so as to enact mouse-functions or on-screen cursors or arrows functions as may be required.

s) The devices/housings embody so as to support the hands, hypothenars, and palms, and embody so as to never require being handheld for the purpose of operating the keys.

DRAWINGS—FIGURES

FIG. 3 shows the two halves of the device oriented in best ergonomic vertical neutral-posture positions from the rear, though the scale of FIG. 3 does not permit showing how the devices/housings can also be positioned horizontally and separated apart at operators' preferred shoulder distances or at other optional distances.

FIG. 4 is a reference diagram to show the two halves of the device joined and the two integrated, hinged, ratcheted, and lockable bases joined, so that the keys-input planes can be angled between flat horizontal and straight-up vertical, and joined, into one of many possible user-preferred positions, as illustrated with operators' hands superimposed over the keys-input planes.

Figure 8:
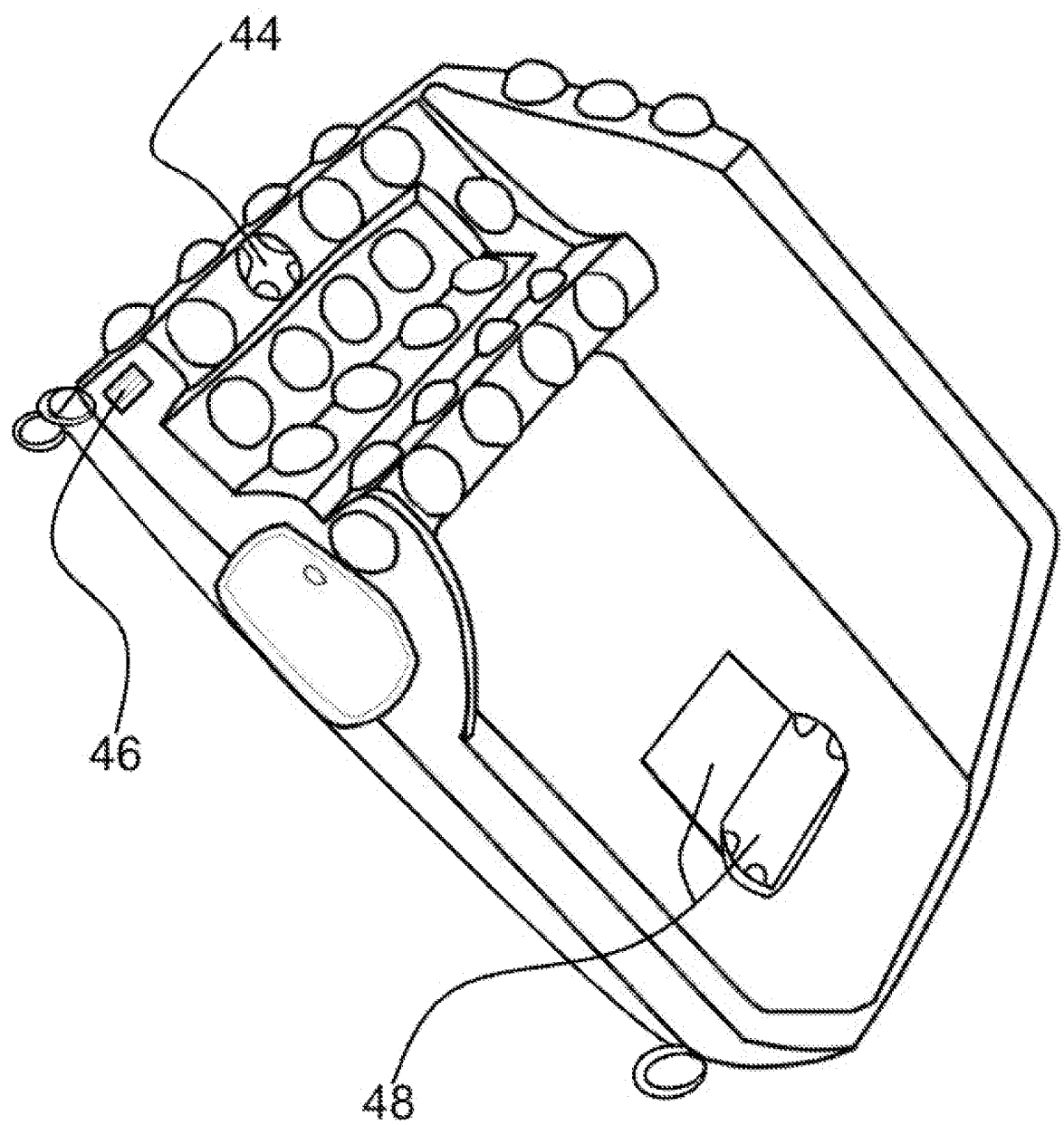

FIG. 8 is a reference diagram that shows a perspective of an embodiment of the right-handed half of the devices/housings with a cursor-key optional utility key that can replace any one or more keys anywhere on the devices/housings, that shows the integrated microphone that can be used for voice commands or other, and that shows an optional combination touchpad/palm-key/clutch that can be used to engage or disengage any and all devices'/housings' functions and keys-inputs or key-commands or key-pressure-settings or actuations as may be operator-preferred or required.

Figure 9:
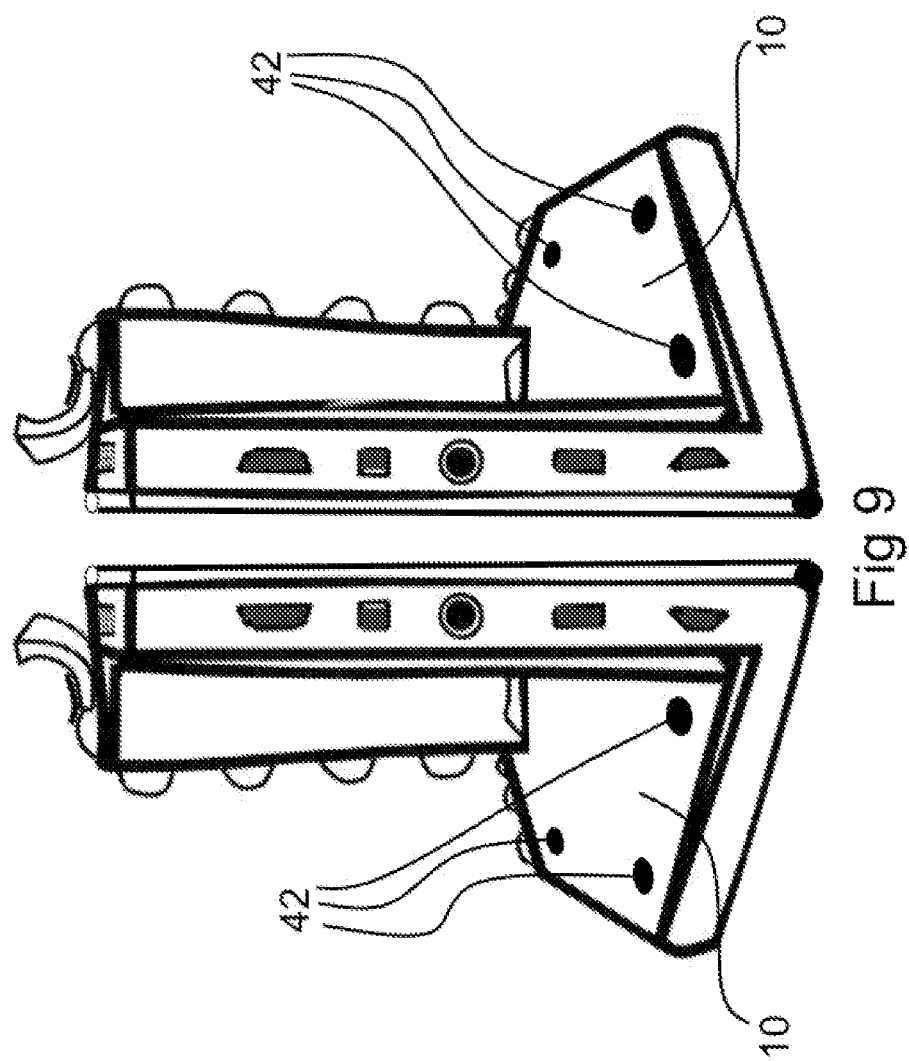

FIG. 9 shows the two halves of the devices/housings in another embodiment both oriented into vertical neutral postures, and then showing optional bolt accesses to fasten the devices/housings stably to horizontal surfaces, or even to angled surfaces, as may be operator-preferred or required for professional applications, including, but not limited to, for medical surgery.

Figure 10:
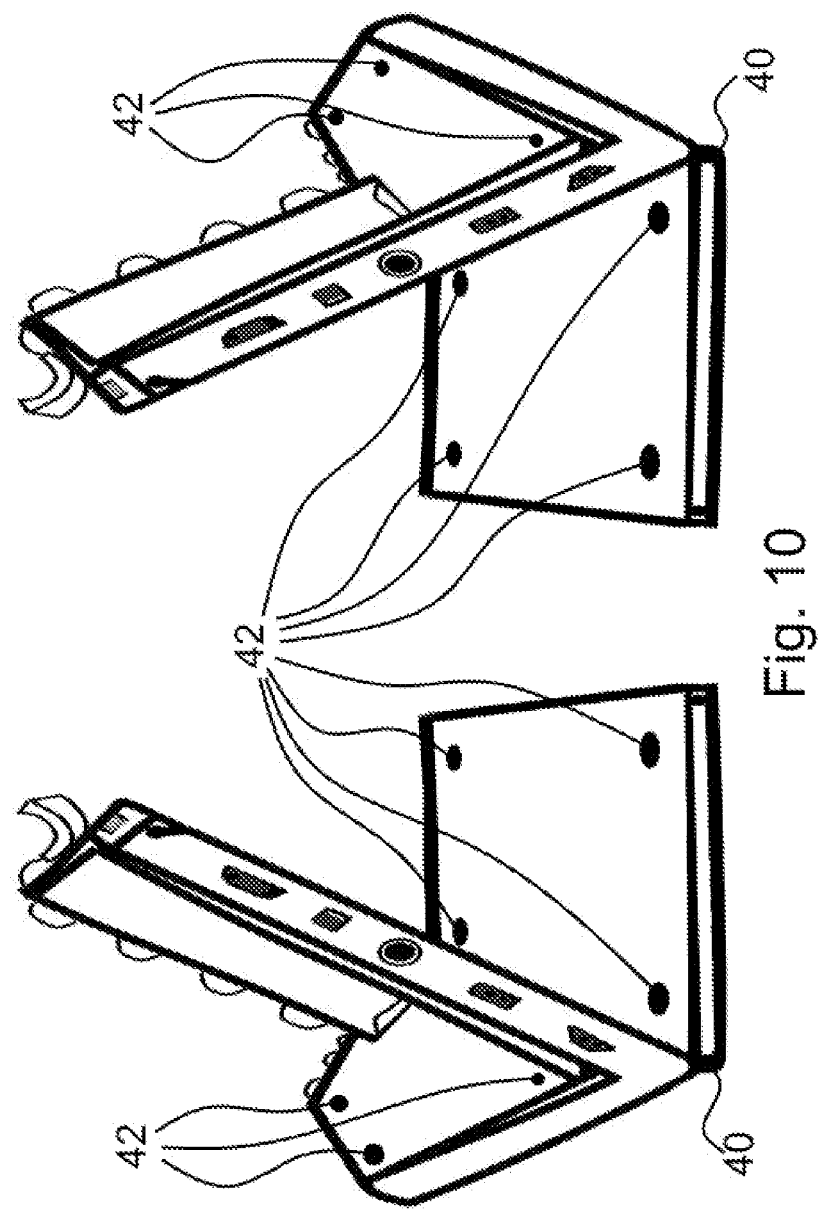

FIG. 10 shows the two halves of the devices/housings in further embodiments both oriented into one of many operator-preferred, between-vertical-and-horizontal postures, as may be ergonomically required, and then locked into those postures by the ratcheted lockable hinges, and also showing optional bolt accesses (42) to fasten the bases of the devices/housings to horizontal surfaces or even to angled surfaces as may be operator-preferred or required for professional applications, including, but not limited to, for medical surgery.

Figure 11:
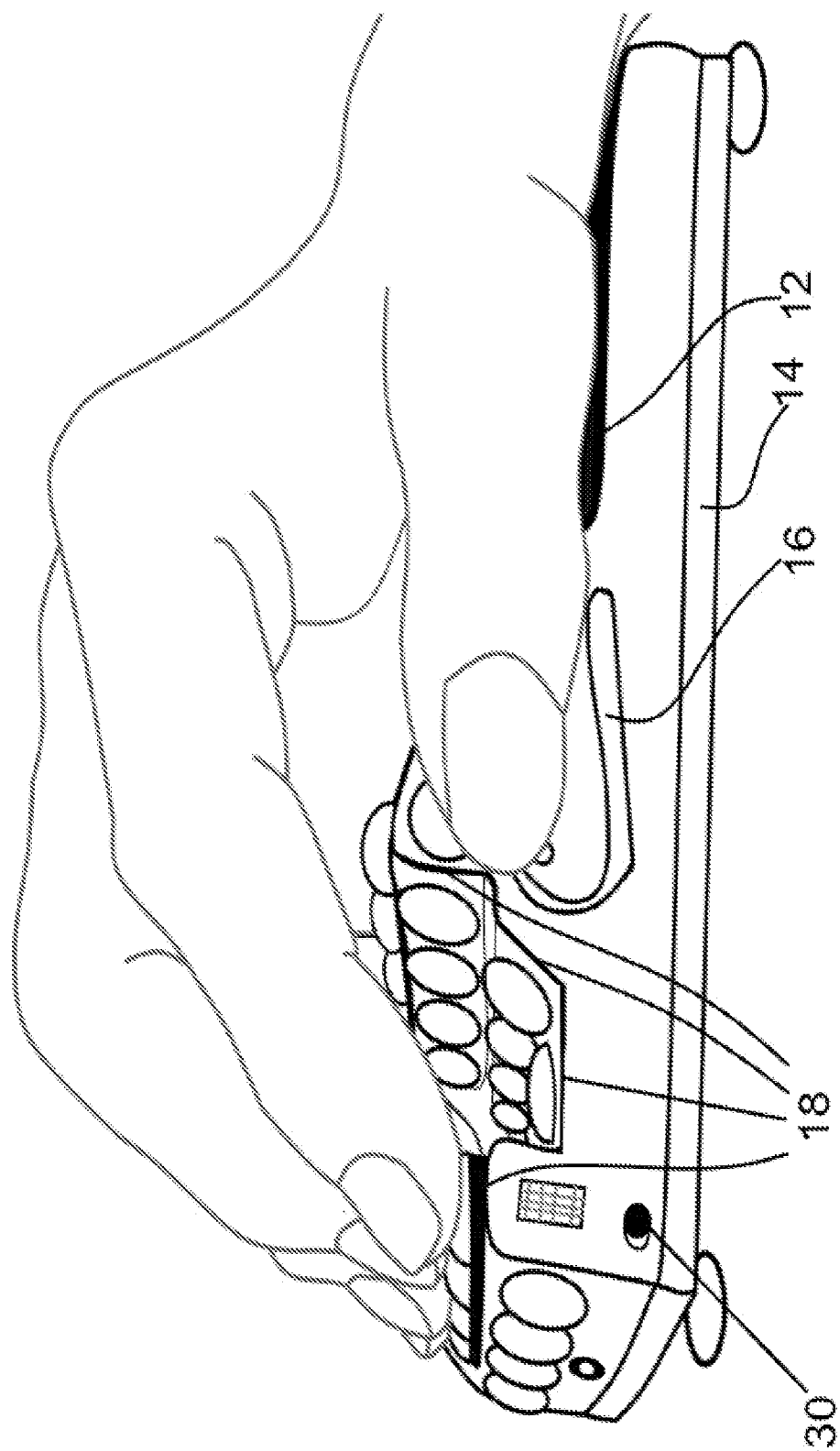

FIG. 11 shows an embodiment of the right-handed half of the devices/housings as in either a flat horizontal or straight vertical orientation in order to illustrate a hand superimposed over the device in one operating position with the appropriate unique design features illustrated, in a view the mirror image of which would exhibit an embodiment of the left-handed half of the devices/housings, with the parallel features.

DRAWINGS—REFERENCE NUMERALS

10 Hypothenar Rest with hook-and-loop fastener technologies on top and bottom
12 Palm Rest with hook-and-loop fastener technologies
14 Hinged and Ratcheted and Weighted Non-Skid Lockable Base with hook-and-loop fastener technologies on bottom for Raising or Lowering and Stabilizing the Preferred and Rotational Horizontal Inclinations of Each Half of the Devices/Housings.
16 Scalloped Two-Way Thumb Key
18 Stair-Stepped-Key-Ledges One, Two, Three, and Four
20 Domed Key—Customizable to Dimensions, Pressure, Function, and Composition
22 Raised Ledge for Added Little-Finger-Key and Little-Finger Ergonomic Access
24 Utility Keys
26 Device's Bolt-to-Chair Access Feature
28 Joiner Rings
30 Device-to-Hinged/Ratcheted Non-Skid Base Lock-Release
32 Base with hook-and-loop fastener technologies on bottom for Neutral-Posture Vertical Device-Orientation
34 Customizable Joiner Links
36 Utility Extra Thumb-Key for Pressing or Pinching Gestures
38 Utility Lens
40 Lockable-Unlockable Ratcheting Hinge, for vertically rotating the device into an operator-preferred ergonomic position
42 Bolt-to-Desktop/Tabletop Optional Utility Access Feature
44 Cursor-Key Optional Utility Key
46 Integrated Microphone
48 Optional Palm-Key/Clutch and/or Touchpad
50 Optional Device-Cradle
52 Adaptable and Customizable Angled-Struts for Optional Positioning of the Device on a Cradle

DETAILED DESCRIPTION—FIGS. 1A AND 1B—FIRST EMBODIMENT

Figure 1A:
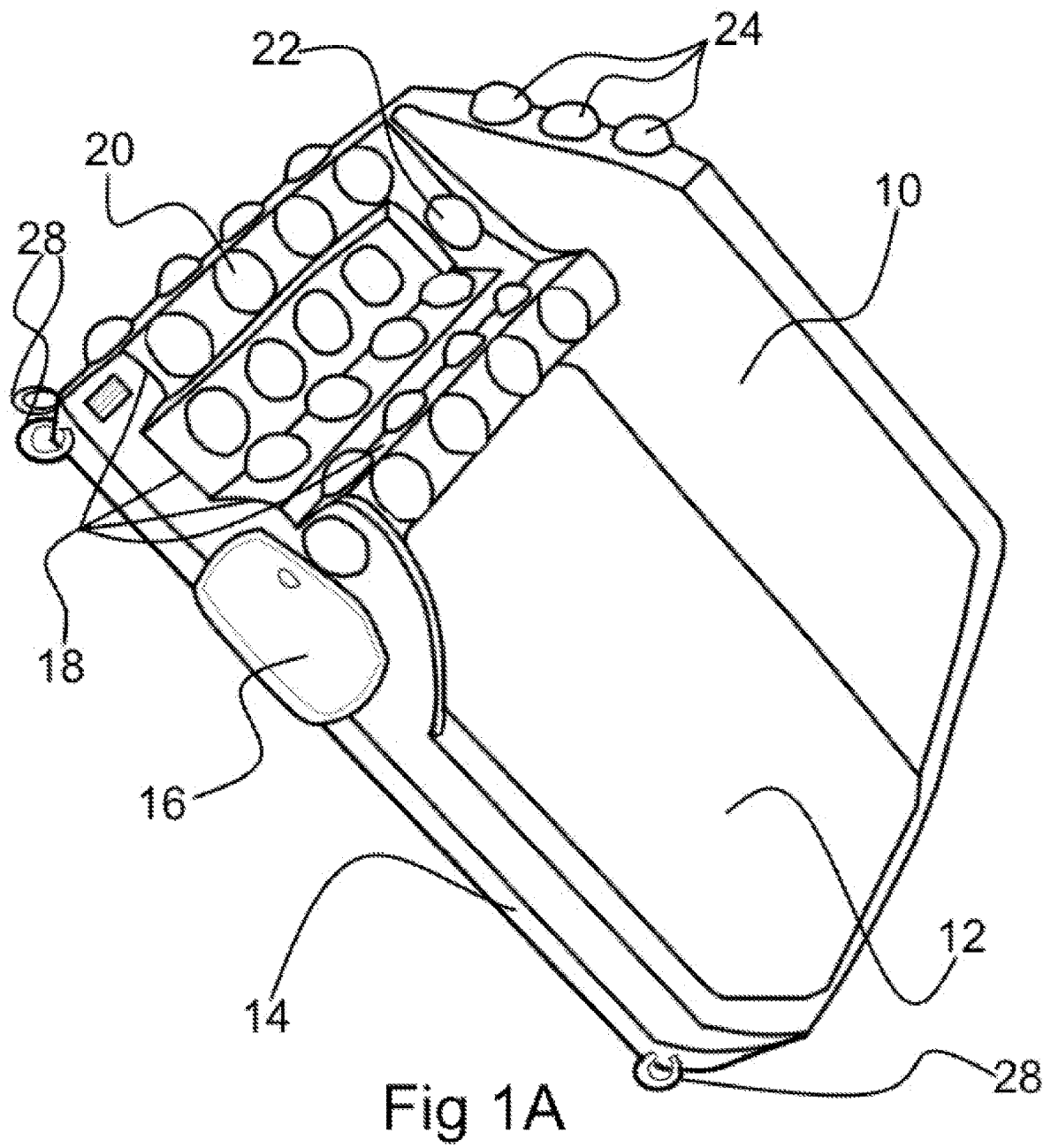
FIG. 1A shows a perspective of the right-handed half of the separable-joinable devices/housings from above.
Figure 1B:
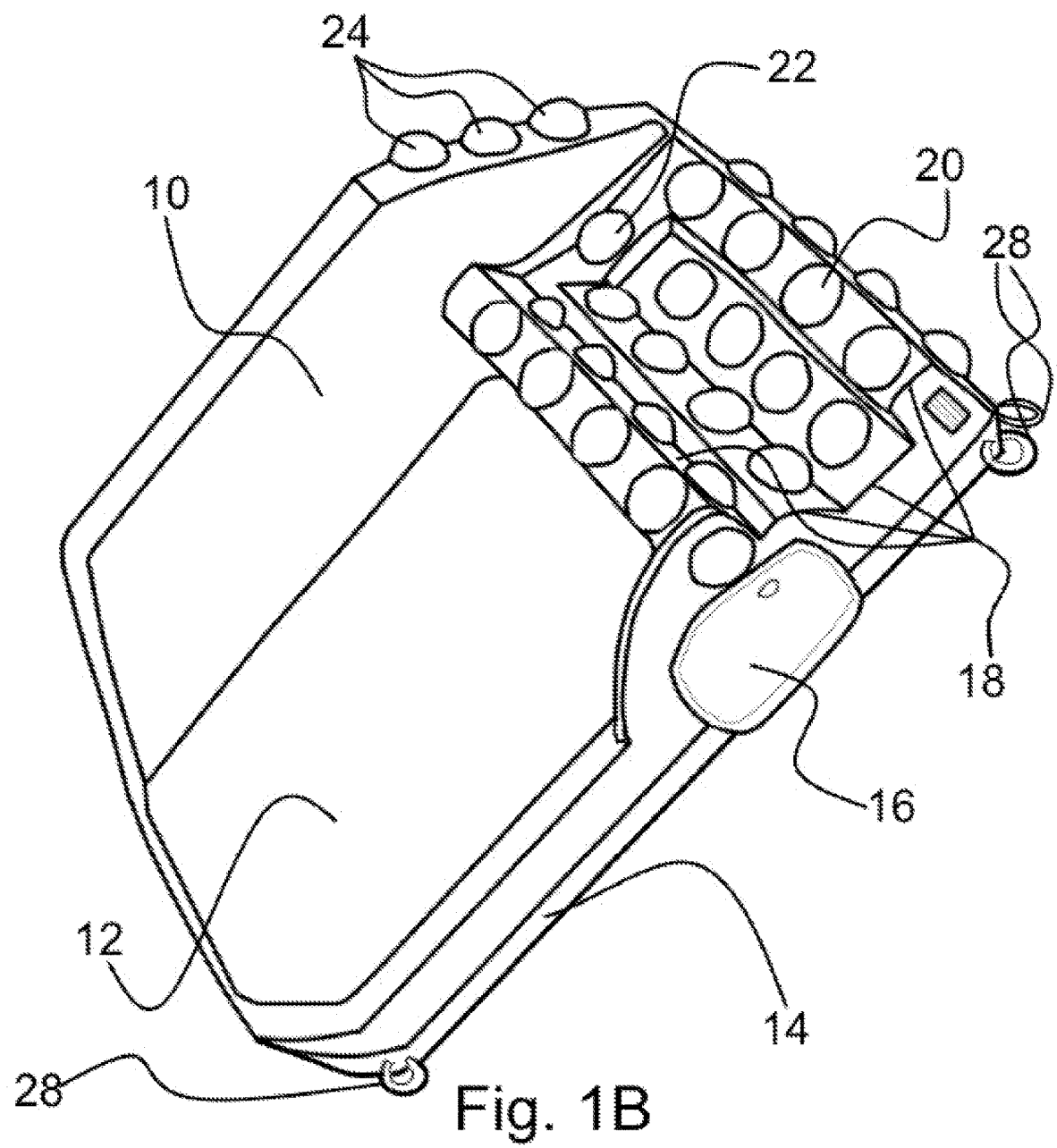
FIG. 1B shows a perspective of the left-handed half of the separable-joinable devices/housings from above.

One embodiment of each of the separated devices/housings is shown closed and locked in FIG. 1A and FIG. 1B, with FIG. 1A for an operator's right hand and with FIG. 1 B for the operator's left hand. Each device has a dedicated hypothenar rest (10) to support the weight of the hand when the device is rotated on its base to any degree above horizontal along a vertically rotational axis; each device's hypothenar rest provides hook-and-loop fastener technologies to attach to optional gelatin-cushions (as also provided with hook-and-loop fastener technologies) so that operators have added hypothenar cushioning-support and can achieve greater finger-separation from possible compression up against the hypothenar rest, in order for fingers to reach keys without impedance; each device has a dedicated palm-support (12) also covered with hook-and-loop fastener technologies, to further support the weight of the hand and so that additional padding may be attached for operator comfort as desired; each device has a hinged and lockable ratcheted and weighted base (14) so that the keys-input planes of each device can be elevated from the perspective in FIG. 1A and FIG. 1 B and rotated along a vertical axis to approach a perfect vertical neutral-posture, while allowing for any operator-selected and modified vertically-oriented angles in-between flat and neutral-postures; each device has a dedicated two-way, scalloped thumb-key/lever (16) to provide easy keys-input as the thumb can be lightly dropped downward; each device has four stair-stepped-key-ledges (18) One, Two, Three, and Four that follow the natural curving posture of the fingers as these start operating keys in relaxed position and continue to curl, so that operators experience little to no finger-extension-stress in order to depress or touch the customizable domed keys (20), said keys which can be customized for size, shape, composition, pressure-of-actuation, and functions; each device has joiner rings (28) as designed to accept customizable links, in the event operators might choose to link both devices/housings, for added stability or for other purposes; each device has pluralities of domed keys (20), which, because of their circular and domed profile, require less surface-area than flat or concave square keys, in order to be contacted by lesser movements of the finger-tips; each device has a dedicated and raised little-finger-key-ledge (22) with another domed key (20), for easier access to dedicated keys by operators' shorter little fingers; each device has seventeen principal keys arrayed on the four principal stair-stepped-key-ledges (18), for a total of thirty-four on the devices/housings, to allow for English-alphabet applications as may be desired for alphanumeric- or calculator-input; each device provides a plurality of added utility keys (24) beyond those as required for an English-alphabet application of inputs; each device provides a plurality of joiner-rings (28) for accepting customizable links, so that operators can join the devices/housings in any horizontal, vertical, or gradated orientations as may be needed or preferred; each device is software or hardware programmable, with fully integrated wireless and computing technologies, so as to be useful for any professional, medical, gaming, or recreational applications where keys-input is necessary; each device houses hardware to send wireless signals to external devices and peripherals; each device integrates a microphone, in the event operators might wish to issue programmable voice commands during key-activations. Note that the devices/housings are of sufficient customizable sizes and dimensions to not only embed keyboard-keying-membranes or actuator switches, but also to house computers, cell-phones, hardware, processors, and other such miniaturized technologies that may be developed.

The custom-sizable devices/housings as embodied in FIG. 1A and FIG. 1 B are 17.8 cm long, 10.16 cm wide, and 7.62 cm high from bottom of base (14) to top of hypothenar rest, and 5.08 cm from the surface of the palm rest (12) to the top of the hypothenar rest (10); the longwise width of the hypothenar rest is 1.27 cm; the length of the scalloped thumb-key (16) is 3.175 cm.; the widths of the stair-stepped key-ledges (18) one-through-four are 1.27 cm.; while the diameter of the domed keys (20, etc.) is 1.111 cm.; and the distance from the center of one domed key to the next is 1.905 cm.; all measurements as reading left to right on FIG. 1A; note that stair-stepped-key-ledge One is 2.223 cm. high from the base (14); stair-stepped-key-ledge Two is 1.428 cm. high from the base (14); stair-stepped-key-ledge Three, oriented at a 45-degree angle between horizontal and vertical and facing front, is 1.905 cm. high from the base (14); and forward-facing stair-stepped-key-ledge Four is 6.35 cm. high from the base (14); the vertical width (measuring from desktop/operating-surface to juncture) of the weighted base

(14) is 1.27 cm.; (and these dimensions apply equally to parallel parts in FIG. 1B, as well); as all specifications collected in this embodiment might best ergonomically accommodate medium-large hands, palms, hypothenars, and fingers. The devices/housings and the domed buttons can be 3D-modeled/printed, molded, and made of composites, carbon-fibers, plastics, fiberglass, stainless steel, glass, and other suitable or customizable materials as may be required by professionals in various industries or by operators engaged in leisure activities; while the devices/housings provide multiple rear connector ports and slots, and can also house aforementioned integrated technologies, such as battery compartments and wireless transceivers for un-cabled operation and for remote-control of other devices, such as miniaturized projectors, such as computer-chips and processing hardware, and such as optional hardware that hosts software programming modules, among many.

DETAILED DESCRIPTION—FIGS. 2A AND 2B—SECOND EMBODIMENT

Figure 2A:
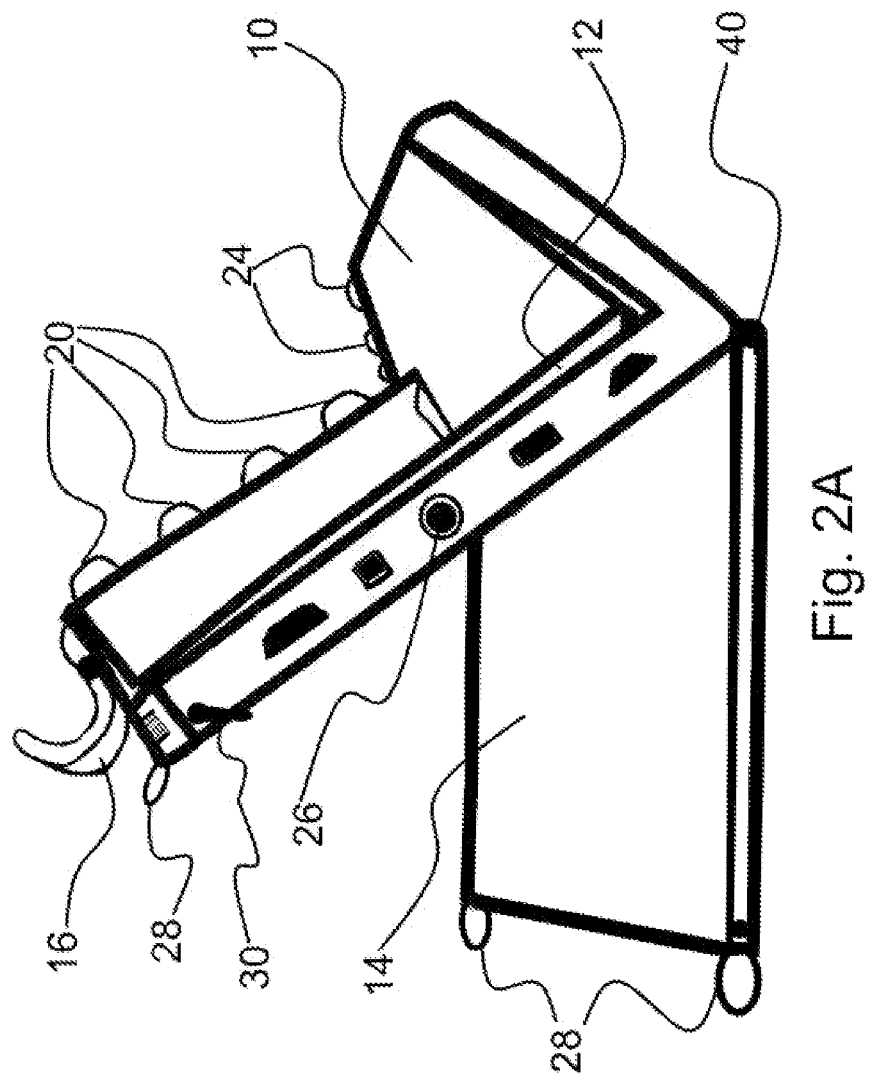
FIG. 2A shows the right-handed half of the devices/housings from the rear as exhibited vertically rotated and angled on and by its hinged base, though not positioned in an ideal ergonomic neutral-posture orientation.
Figure 2B:
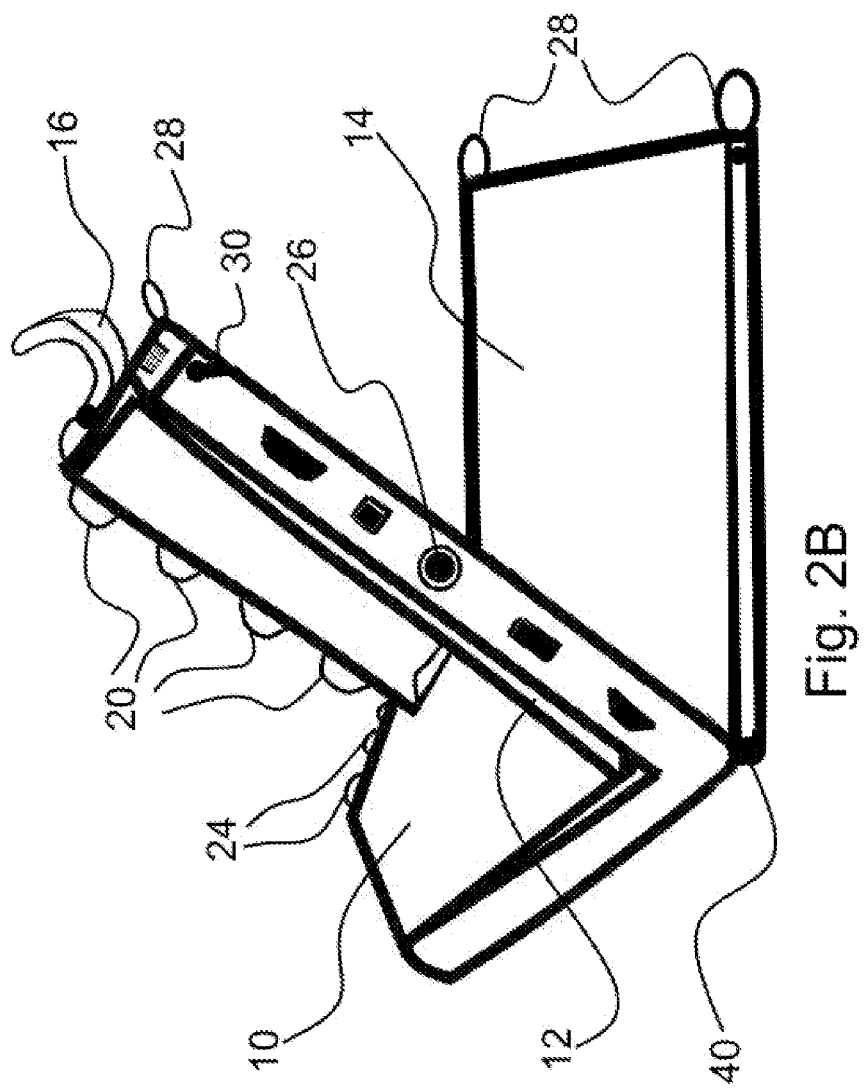
FIG. 2B shows the left-handed half of the devices/housings from the rear as exhibited vertically rotated angled on and by its hinged base, though not positioned in an ideal ergonomic neutral-posture orientation.

One embodiment of each of the separated devices/housings is shown open and locked in FIGS. 2A and 2B, showing each of the devices/housings from the rear, with FIG. 2A an embodiment for the operators' right hands, and FIG. 2B an embodiment for the operators' left hands. In these embodiments, the hypothenar rests (10), palm rests (12), customizable domed keys (20), the keys-input planes and the scalloped thumb-keys (16) are rotated into an approximately 45-degree angle up from horizontal toward vertical where the hypothenar rests (10) and the palm rests (12) will support the hypothenars and support the hands-weights; each half of the devices'/housings' horizontal and weighted bases (14) has been unlocked from its device-to-base lock-release (30), and then rotated and re-locked into an operator-preferred vertically rotational orientation by the ratcheted and lockable hinge (40), and adhered to a desktop with hook-and-loop fastener technologies on the bottom surface of the bases (14) and using an operator-preferred application of hook-and-loop fastener technologies tape on the relevant desktop or surface; the ergonomic shape of the dedicated scalloped thumb-keys (16) is more visible than shown in the first embodiment; two arrays of the devices'/housings' utility (24) and customizable domed keys (20) are also shown; each device further exhibits the unique built-in bolt-to-chair access (26), not shown in use in this embodiment; each of the devices/housings has joiner rings (28) on both the lockable base and on each of the devices/housings as well, for operators' optional connections; while the rear aspect of each device reveals plenty of space for multiple-couplings, cablings, or attachments to peripherals as may be desired, including, but not limited, to power-cables, USB, Firewire™, telecommunications, disk/microdisk, telephonic, Lightning™, infrared, laser, and other types of connectors or peripherals existing or as may be developed.

DETAILED DESCRIPTION—FIG. 3—THIRD EMBODIMENT

One principal embodiment of both of the devices/housings is shown from the operators' perspectives in FIG. 3, where the devices/housings are placed and separated on a tabletop or desk-top or suitable surface in ergonomic vertical neutral-postures, where the devices/housings embody the hypothenar rests (10), the interior of which are covered with hook-and-loop fastener technologies and which serve to support the weights of the hands and palms, especially when combined with an optional added attached gelatin-cushion or comfort-pad fitted with hook-and-loop fastener technologies on one side, for example; the devices/housings embody dual-service hypothenar rests (10), which opposite (desktop/tabletop) sides can also serve as the devices'/housings' bases (32) and also covered with hook-and-loop fastener technologies for anchoring to a table-top, desktop, or other surface treated with hook-and-loop fastener technologies tape, for added stability when the devices/housings are positioned vertically into the ergonomic neutral-posture; the devices/housings embody the cushioned palm rests (12) also provided with hook-and-loop fastener technologies, with said palm rests only slightly visible from this rear perspective in FIG. 3; the devices/housings exhibit the scalloped two-way thumb-keys (16); the devices/housings exhibit the customizable domed keys (20); the devices/housings exhibit the integrated bolt-to-chair access (26), not utilized in this embodiment; each half of the devices/housings may be placed right up to and contacting the other half of the devices/housings and linked with joiner rings (28) combined with optional and varied-sizes joiner-links, or each device may be separated and positioned as far apart on a horizontal working plane, as an operator may prefer or be able to reach, or at operators' preferred shoulders-width distances apart; each device could also be conceivably positioned on two differing horizontal planes not at the same heights, should operators so prefer; or each device could be used singly, in conjunction with other tools, such as with pens, pencils, computer-mice, track-balls, others, and others, including those not yet developed, etc.

DETAILED DESCRIPTION—FIG. 4—FOURTH EMBODIMENT

FIG. 4 shows an embodiment of the separable devices/housings placed on a table-top or desk-top in a partially-vertical operator-preferred orientation as may be desired, with devices/housings and hinged bases (14) optionally linked or joined using the joiner rings (28) as linked for added vertical stability, and with operators' hands made visible so as to reveal the advantages to operators to attain preferred or optional ergonomic horizontal and vertical rotational angles of address to the stair-stepped-key-ledges' One, Two, Three, and Four (18) presenting the devices'/housings' domed keys, while the hypothenars are supported by dedicated hypothenar rests (10) and palms are supported by the dedicated palm rests (12).

DETAILED DESCRIPTION—FIG. 5A AND 5B—FIFTH EMBODIMENT

Figure 5A:
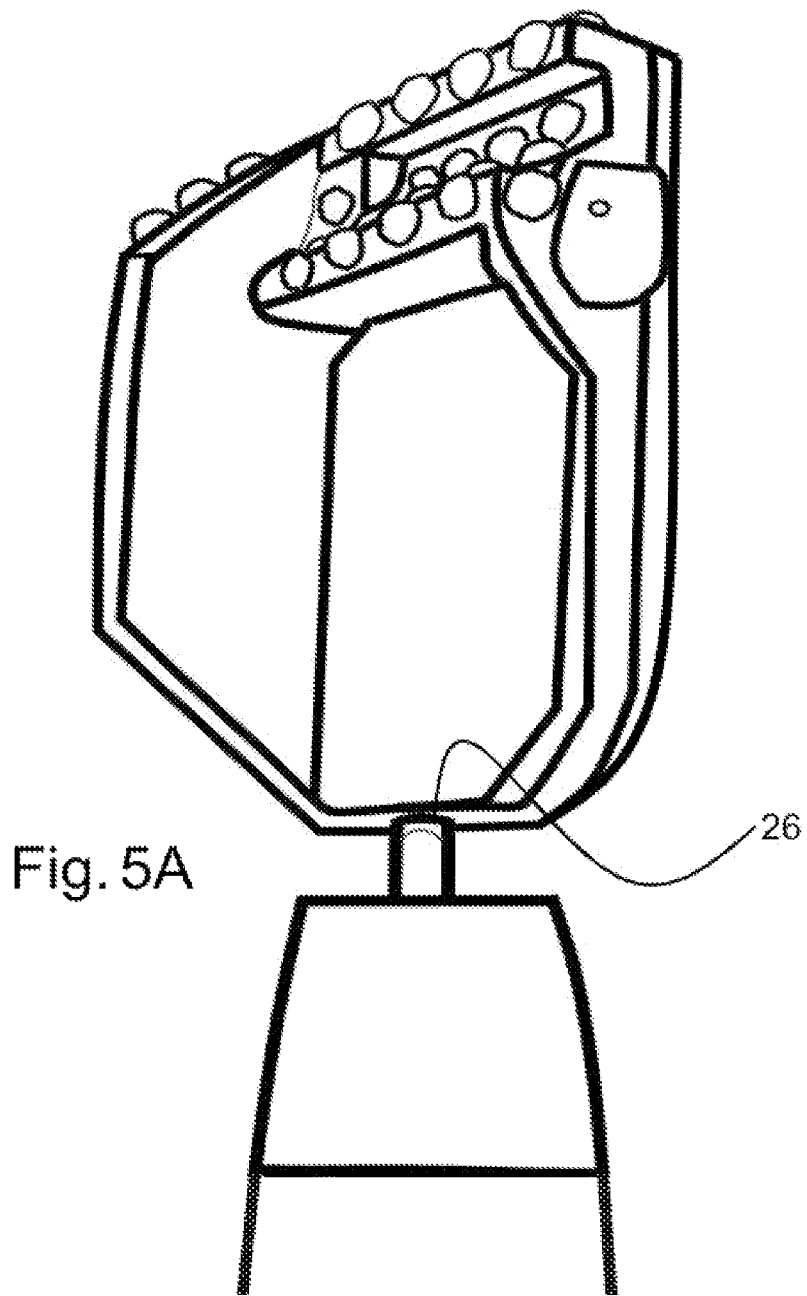
FIG. 5A shows the left separated half of the devices/housings attached and partially rotated towards vertical by the integrated bolt-accesses to the end of the arm of a work, gaming, musical, medical, desk, professional, lounging, or other type of operator-adapted chair.
Figure 5B:
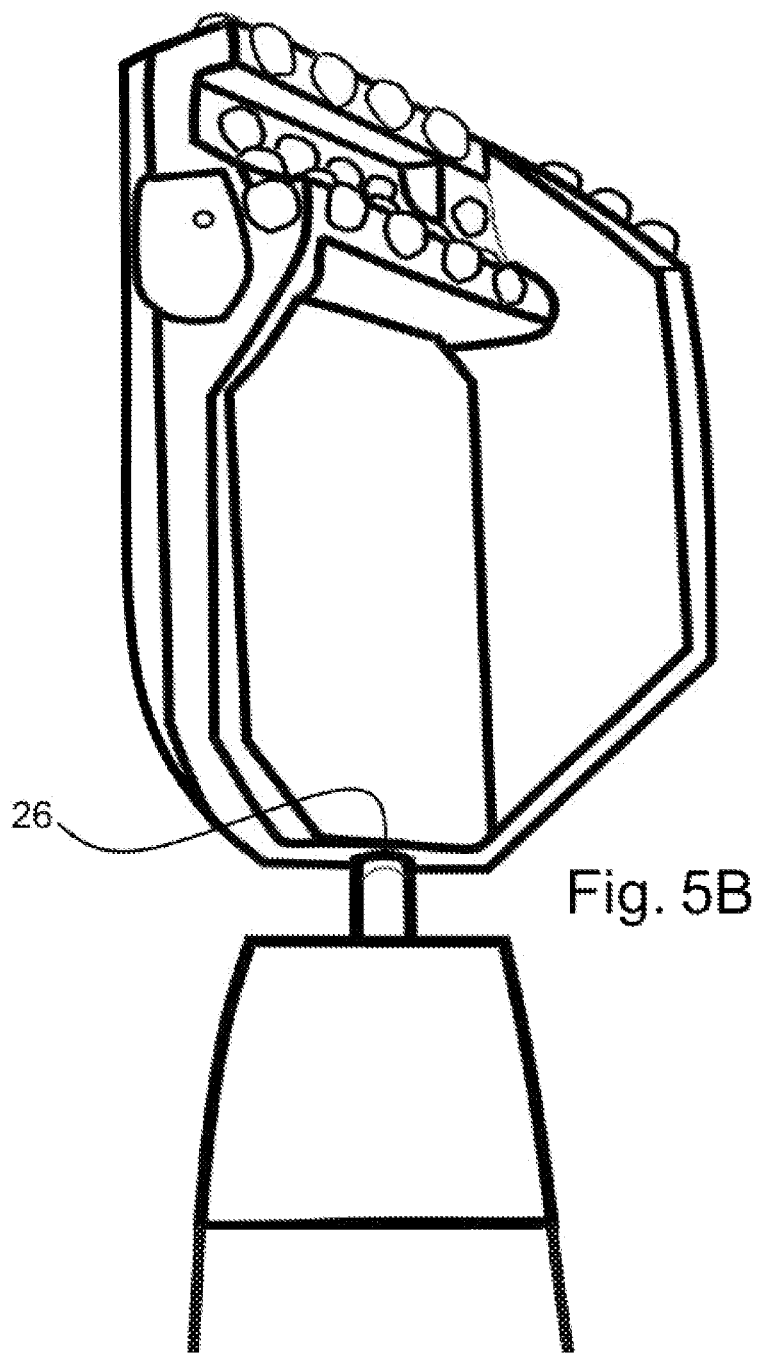
FIG. 5B shows the right separated half of the devices/housings attached and partially rotated towards vertical by the integrated bolt-accesses to the end of the arm of a work, gaming, musical, medical, desk, professional, lounging, or other type of operator-adapted chair.

FIGS. 5A and 5B show an embodiment of the separable devices/housings as attached to the ends of the arms of suitably-modified desk, occupational, gaming, or professional chairs via the integrated bolt-access (26). FIG. 5A is the left half of the Devices/Housings on a chair-arm, while FIG. 5 B is the right half of the Devices/Housings on a chair-arm. In these embodiments, the devices/housings are rotated in partial vertical and partial horizontal orientations as may be operator-preferred, though the unique bolt-access design allows for the devices/housings also to be rotated and oriented into the aforementioned ideal neutral-posture while also being lockable into any operator-preferred horizontal-to-vertical rotational orientations on the ends of chair-arms.

Operation—FIGS. 1A, 1B, 2A, 2B, 3, 4, 5A, 5B

The manner of using the wireless, programmable, and separable devices/housings for any kind of finger-andthumb-driven keys-input can begin with operators resting their right hypothenars against the hypothenar rest (10) in FIG. 1A, with or without an optional gelatin-pack cushion or spacer between their hypothenars and the hypothenar rest, and simultaneously resting their right palms on the palm rest (12), and resting their thumbs into the scalloped thumb-key (16), and resting their four fingers on the accessible domed keys (20) on stair-stepped-key-ledge One (counting from the front or lens-mounted side of the devices/housings) of the four stair-stepped-key-ledges (18). With very slight to no movement, operators may move their little fingers to depress the convenient raised-little-finger-key (22) on its dedicated ledge. Operators with different sized hands and fingers will find use of the custom-sizable devices/housings suitable to their unique hand-sizes, whereby the fourth of the stair-stepped-key-ledges (18), counting from the front of the devices/housings, falls beneath the largest joints of their fingers, allowing for a natural curl of the fingers to simply drop to depress keys on stair-stepped-key-ledges (18) One, Two, Three, and Four; while a natural fall of the thumb will either depress or a natural 'pinch' of the thumb can activate the two-way scalloped thumb-keys (16) and utility thumb-keys. Operators need not worry that resting fingers and thumbs on the keys will actuate keys, since the pressure and latency of time for keys' key-actuations are software- or hardware-programmable. Similarly, the manner of using the devices/housings for the left hand (FIG. 1B) parallels that as mentioned above for FIG. 1A.

Operators do have the option of unlocking the devices/housings from their locked and ratcheted bases (14) in order to rotate the keys-input planes of the keys away from a flat horizontal and up along any degree of vertical orientation as may be preferred for ergonomic comfort, as can be seen in one orientation of the devices/housings in FIG. 2A and FIG. 2B, the former to accommodate the right hand, the latter to accommodate the left hand, where once again keys-input for ergonomic comfort can rely on the hypothenar being fully supported by the hypothenar rest (10), the palm resting on the palm rest (12), the thumb resting on the scalloped thumb-key (16), with overall stability for the devices/housings guaranteed by the hook-and-loop fastener technologies attached to the bottom of the base (14) as attached to optional hook-and-loop fastener technologies tape applied to a desktop or table-top or other surface.

For operators wishing to input keys from an ideal vertical ergonomic neutral-posture, the devices/housings' hinged and lockable bases (14) can be closed and locked, and then the devices/housings can be oriented upright into a direct vertical neutral posture by positioning them on a desktop or table-top or horizontal surface as illustrated in FIG. 3, whereby the obverse sides of the hypothenar rests (10) also serve as bases for the devices/housings, bases which can be stabilized to a desktop, table-top, or horizontal surface via integrated hook-and-loop technologies along with optional hook-and-loop fastener technologies tape when the devices/housings are maintained in a vertical position; or otherwise the separable/joinable devices/housings may be separated and positioned at any distance apart, to more closely match operators' shoulder or preferred widths, or else joined, for operator-preference, by links engaging the integrated joiner rings (28); operators may rest their hypothenars comfortably on the hypothenar rests (10), or on gelatin-packs or cushions affixed to the hypothenar rests (10) by means of hook-and-loop fastener technologies, the operators can rest their thumbs resting within the scalloped thumb-keys (16), and they can rest their fingers relaxed and curled and held by the mild friction of the domed keys (20) on stair-stepped-key-ledges One, Two, Three and Four not visible in this FIG. 3.

In the event that operators require or prefer inputting keys from partial horizontal and partial vertical angles of address, FIG. 4 illustrates an additional intended manner of using the devices/housings showing the hinged and lockable base (14) unlocked and positioned on a desktop, table-top, or horizontal surface, this base joined by links to the other hand's base, while FIG. 4 also shows the hands for reference with hypothenars resting on hypothenar rests (10), palms supported by palm rests (12), the fingers resting on Number One of the four stair-stepped key-ledges (18). The bases (14) can be unlinked by removing links to the joiner rings (28), and the devices moved horizontally apart to more closely match operators' shoulders-width distances or other preferred distances as may be preferred or required.

FIG. 5A and FIG. 5 B illustrate the accessibility to the embodied manner of using the wireless, programmable, and separable devices/housings for any kind of finger-and-thumb-driven keys-input for operators who need the stability of inputting keys while sitting in a professional, recreational, or other kind of chair by bolting the devices/housings to a chair-arm using the integrated and unique bolt-access (26) as illustrated in FIG. 5A for the left hand and FIG. 5B for the right hand, whereby the devices/housings and their keys-input planes can be rotated and locked by the bolt in any orientation from horizontal to vertical neutral-posture or more. In these orientations, operators may continue to utilize the devices'/housings hypothenar rests (10), palm rests (12), scalloped thumb-keys (16), domed keys (20), and four stair-stepped key-ledges (18).

Figure 6A:
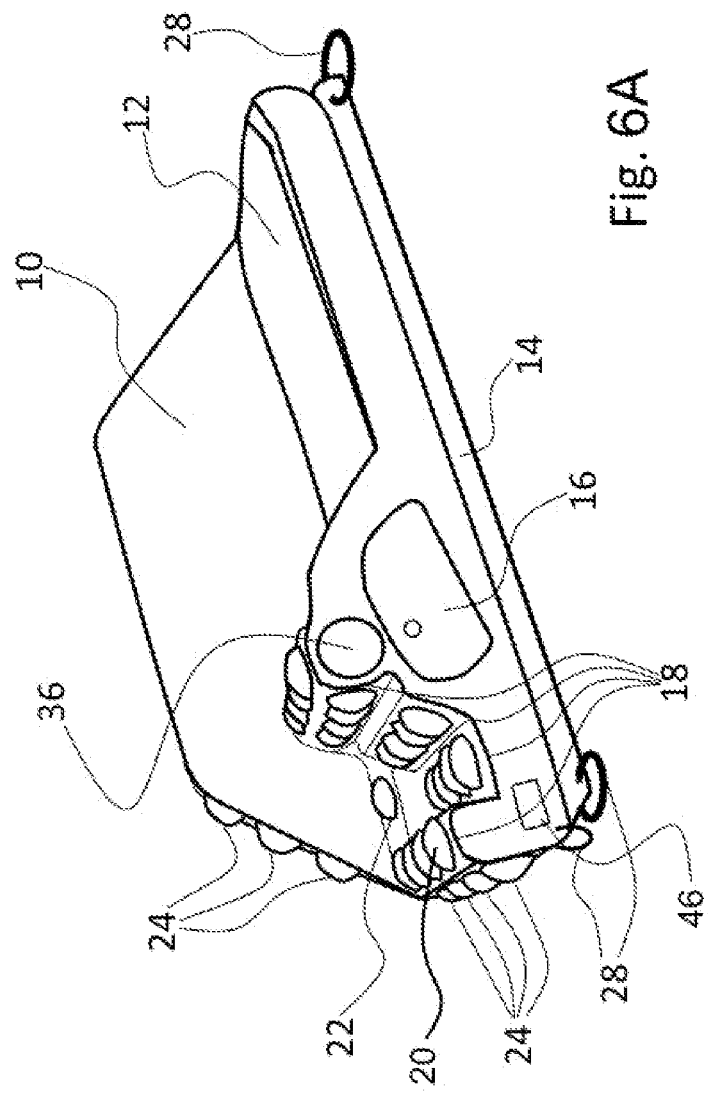
FIG. 6A is a reference diagram that shows the right-handed half of the devices/housings from the side and yields a close-up of the four ergonomic stair-stepped-key-ledges, the scalloped two-way thumb-key, palm- and hypothenar-rests, joiner rings, utility keys, the raised little-finger-key ledge, and a utility customizable and domed thumb-key.
Figure 6B:
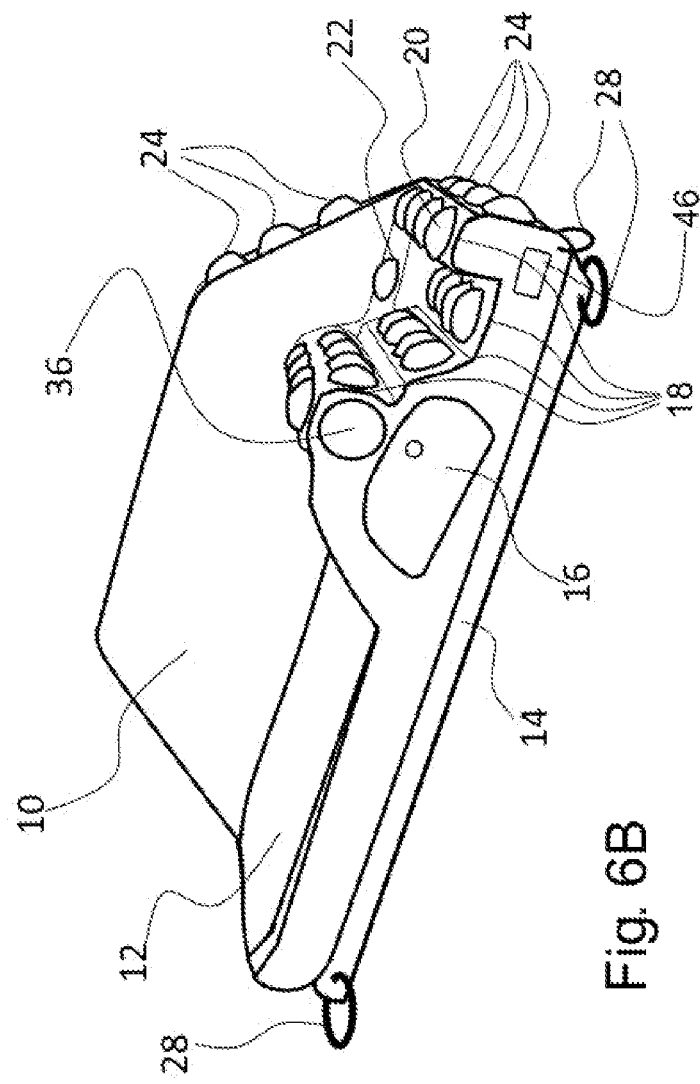
FIG. 6B is a reference diagram that shows the left-handed half of the devices/housings from the side and yields a close-up of the four ergonomic stair-stepped-key-ledges, the scalloped two-way thumb-key, palm- and hypothenar-rests, joiner rings, utility keys, the raised little-finger-key ledge, and a utility customizable and domed thumb-key.

Additional Embodiments—FIGS. 6A and 6B

FIGS. 6A and 6B show another perspective of an embodiment of the separable devices/housings separated, with FIG. 6A for an operator's right hand and with FIG. 6B for the operator's left hand. Each hand-size-customizable device exhibits a dedicated hypothenar rest (10) covered with hook-and-loop fastener technologies to support the weight of the hand when the device is rotated along a vertical axis, with the hook-and-loop fastener technologies provided to lock to an optional gelatin-pack so that the operator can support the hypothenar away from the device to operate keys without impedance against the hypothenar rest; each device has a dedicated palm-support (12) also covered with hook-and-loop fastener technologies so that additional padding can be added for operator-comfort as desired; each device has a hinged and ratcheted base (14) so that each device can be elevated along the vertical axis to approach an ergonomic neutral-posture, while allowing for operator-selected angles in-between; each device has a dedicated two-way, scalloped thumb-lever/key (16) to provide easy keys-input as the thumb is lightly dropped downward; each device has four 'stair-cased' key-ledges (18) One, Two, Three, and Four that follow the natural posture of the fingers in a relaxed position, so that operators experience little to no finger-extension in order to depress or touch the keys; each device has joiner rings (28) as designed to accept customizable links, in the event operators might choose to link both devices/housings; each device has the plurality of domed keys (20), which, because of their circular and domed profile, require less surface-area than flat or concave square keys, in order to be contacted by the finger-tips; each device has a dedicated and raised little-finger-key-ledge (22) with a domed key, for easier access to the key by the little finger; each device has seventeen principal keys arrayed on the stair-stepped-keyledges (18) One, Two, Three, and Four to allow for English-alphabet applications as may be desired for alphanumeric- or calculator-input; each device provides a plurality of added utility keys (24) beyond those as required for an English-alphabet application of inputs; each device provides joiner-rings (28) for accepting customizable links, so that operators can join the devices/housings in any horizontal, vertical, or gradated orientation as may be needed or preferred; each device is software- of hardware-programmable, with fully integrated wireless and computing technologies, so as to be useful in any profession or gaming venue where humans-operated keys-input is still necessary; each device houses a microphone (46), in the event operators might wish to issue voice commands during key-activations; each device provides sufficient space to serve also as a housing for containing a computer, a cell-phone, or other miniaturized technological hardware modules as may be developed.

Figure 7:
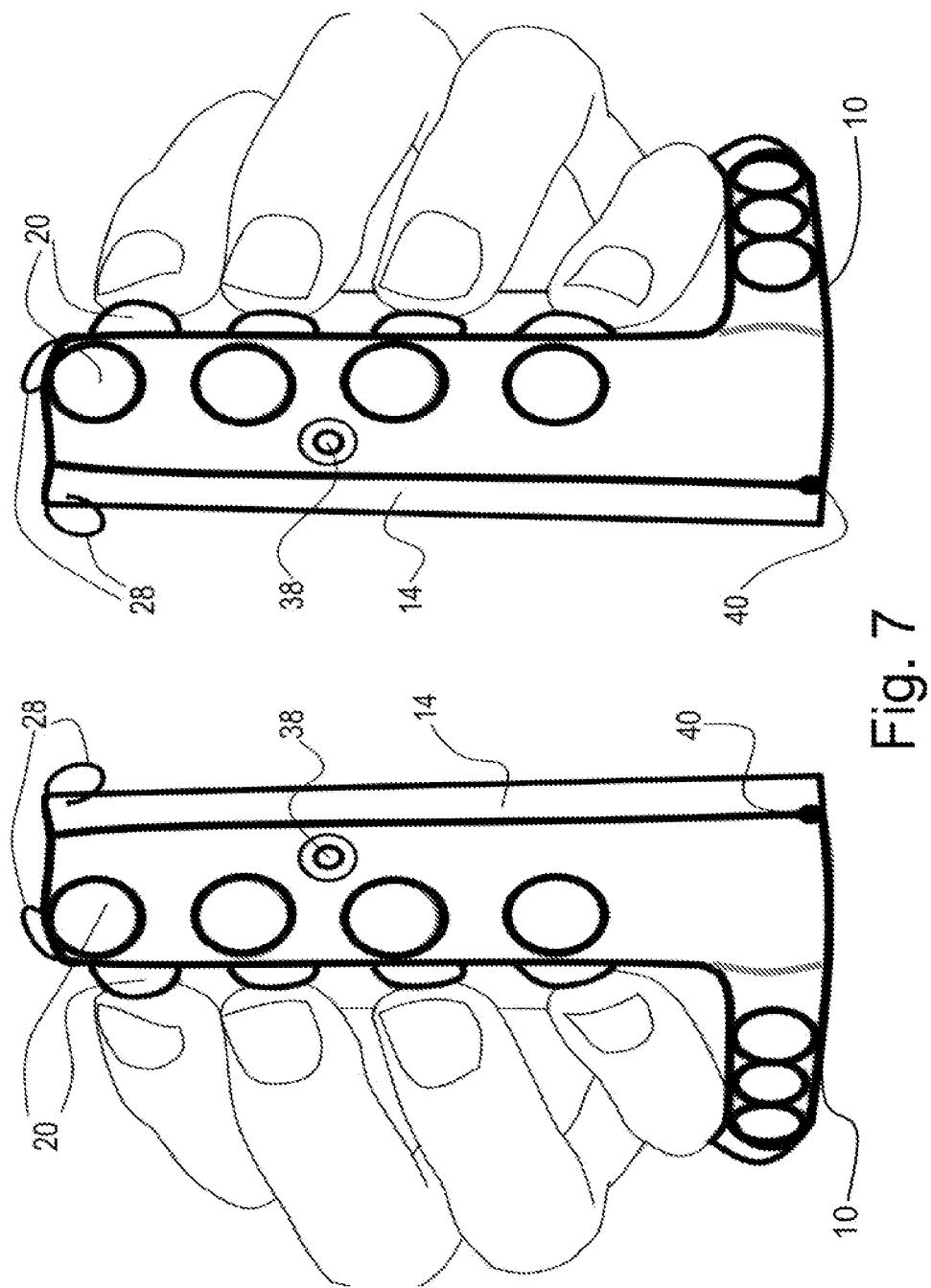
FIG. 7 shows a front view of the separated halves of the devices/housings oriented in vertical neutral-postures on a horizontal surface with operators' fingers superimposed in position, and exhibiting the front-facing utility lenses, domed keys, locked ratchetable hinged bases, and joiner rings.

Operation—Additional Embodiment—Reference FIG. 7

FIG. 7 shows additional embodiments of the left-handed and right-handed separable/joinable devices/housings from front perspectives, exhibiting the devices/housings positioned vertically in vertical ergonomic neutral-posture, and exhibiting the lockable base (14) in a closed or locked position by its device-to-base lock (not shown in this diagram), along with its lockable ratchetable hinge (40); while also exhibiting the customizable domed keys (20), joiner-rings (28), and front-facing integrated lenses (38)—all with human hands superimposed to reveal scale and ergonomic neutral-posture comfort, especially when devices are placed on a horizontal surface at the same height(s) as the unique forearm-plane(s) of a sitting or standing operator.

Operation—Additional Embodiment—FIG. 8

FIG. 8 shows a perspective of an embodiment of the right-handed half of the devices/housings with a cursor-key optional utility key (44), an integrated microphone (46), and a combination touchpad/palm-key/clutch (48), whereby the cursor key (44) can maneuver a graphical icon on a monitor, whereby the microphone (46) can be used for recording or for keys-input actuation, modulation, and/or modification commands, and whereby the optional palm-key/clutch (48) can be used to engage or disengage any and all devices'/housings' functions and keys-inputs or key-commands or key-pressure-settings or actuations as may be operator-preferred or required. The perspective of FIG. 8 as an image can be mirrored 180 degrees horizontally to exhibit a parallel embodiment of the left-handed half of the devices/housings.

Operation—Additional Embodiment—FIG. 9

FIG. 9 shows a perspective of an embodiment of the two halves of the devices/housings from the operators' utilizing-perspective, with both halves oriented side-by-side into ergonomic vertical neutral-postures, and with both halves exhibiting optional bolt-to-desktop/tabletop accesses (42) optionally set within the hypothenar rests (10) to fasten the devices/housings stably to horizontal surfaces, or even to angled surfaces, as may be operator-preferred or required for professional applications, including, but not limited to, for medical surgery.

Operation—Additional Embodiment—FIG. 10

FIG. 10 shows an embodiment of the two halves of the devices/housings both oriented into one of many operator-preferred, between-vertical-and-horizontal postures, as may be ergonomically required, and then locked into those oriented postures on their bases by the ratcheted lockable hinges (40), and also showing optional in-base bolt accesses (42) to fasten the hinged-bases of the devices/housings to horizontal surfaces or even to angled surfaces as may be operator-preferred or required for professional applications, including, but not limited to, for medical surgery.

Operation—Reference Diagram 11

Reference diagram FIG. 11 shows an embodiment of the right half of the devices/housings to illustrate the ergonomic position of the superimposed hand and palm resting on the palm rest (12) of this right half while fingers naturally curl to operate keys on stair-stepped-key-ledges (18) One, Two, Three, and Four, and while the thumb rests comfortably on the scalloped thumb-key (16), to drop as needed with little effort; this embodiment reveals the hinged and lockable base (14) closed and locked. Please note that the perspective of Reference Diagram 11 can be (mentally) rotated clockwise 90 degrees to approximately illustrate the ergonomic address of the hand to the devices/housings half from an operator's vertical neutral-posture; or the perspective of Reference Diagram 11 can be rotated 180 degrees horizontally to illustrate the left half of the devices/housings with a left hand and palm superimposed.

We claim:
1. Ergonomic, neutral-posture, separable, wireless keys-input devices/housings comprising
   a. dedicated hypothenar rests means to support the hypothenars
   b. dedicated palm rests means to support the palms
   c. four stair-stepped-key-ledges means one, two, three, and four to accommodate and support the natural curls and shapes and dropping motions of relaxed human fingers
   d. a plurality of domed keys means to accommodate and support relaxed fingers resting on and/or depressing said domed keys
   e. raised key-ledges means for little-fingers' ergonomic ease of reach and access
   f. scalloped two-way thumb keys means to accommodate and support the natural position of the relaxed thumbs as these may drop
   g. extra utility keys means for added keys-input functions
   h. joiner-rings means for joining the separated devices/housings
   i. hypothenar rests-bases means for stabilizing the devices/housings in vertical ergonomic neutral-postures
   j. hardware-programming means for wireless keys-input telemetry
   k. dedicated and interchangeable lenses and hardware means for telemetry, remote-control, projection, and wireless communications
   l. integrated hardware microphone means for adding voice-activation commands or for recording
   m. hinged and ratcheted and lockable/unlockable bases means
   whereby said bases upon being unlocked raise and lower the inclines of the devices'/housings' hypothenar rests, palm rests, four stair-stepped key-ledges, pluralities of domed keys, raised little-finger key ledges, scalloped two-way thumb keys, extra utility keys, all from horizontal toward vertical and from vertical toward hori- zontal whereafter said bases can lock the devices/housings into a preferred position of ergonomic inclination,
  n. Dedicated bolt-accesses means for attaching the devices to the ends of professional or recreational or other chair-arms.

2. Ergonomic, neutral-posture, separable, wireless keys-input devices/housings comprising
  a. molded and customizable-sized composite carbon-fiber, plastic, fiberglass, stainless steel, glass, and other materials means for presenting a plurality of domed keys and scalloped thumb-keys with added hypothenar rests and palm rests for accommodating human key-input from a neutral and/or any-human-hand-sized rotational posture
  b. integrated hardware and lenses means for sending wireless keys-input actuation signals to external devices and peripherals
  c. integrated microphone hardware means for recording and voice actuation of keys-input
  d. integrated hardware means for accepting software programming for multiple types of keys-input information
  e. integrated hardware means for accepting software programming for setting key-pressure sensitivities and actuator-thresholds
  f. integrated hardware means for accepting software programming for assigning any values and functions and meanings to interpretations of any keys-inputs
  g. integrated metal ratcheting hinges means for unlocking and locking the devices'/housings' bases in order to re-orient the keys-input planes from horizontal to vertical and from vertical to horizontal
  h. integrated lock-releases means for unlocking and locking the aforementioned metal ratcheting hinges
  i. integrated joiner rings means made of suitable composite or other materials means for securely joining each half of the devices'/housings and for also joining the bases of the devices/housings,
  j. sufficient interior and exterior spaces means for housing said miniaturized and other hardware and software technologies, said added keys, batteries, and processors,
  k. Integrated bolt-access hardware means for attaching to professional or recreational chair-arms.

* * * * *